(12) United States Patent
Bonwick et al.

(10) Patent No.: US 8,370,567 B1
(45) Date of Patent: Feb. 5, 2013

(54) STORAGE SYSTEM WITH SELF DESCRIBING DATA

(75) Inventors: Jeffrey S. Bonwick, Los Altos, CA (US); Michael W. Shapiro, San Francisco, CA (US)

(73) Assignee: DSSD, Inc., Menlo Park, CA (US)

( * ) Notice: Subject to any disclaimer, the term of this patent is extended or adjusted under 35 U.S.C. 154(b) by 0 days.

(21) Appl. No.: 13/428,771

(22) Filed: Mar. 23, 2012

(51) Int. Cl.
*G06F 12/00* (2006.01)

(52) U.S. Cl. .............................. 711/103; 711/E12.008

(58) Field of Classification Search .................... None
See application file for complete search history.

(56) References Cited

U.S. PATENT DOCUMENTS

| | | | |
|---|---|---|---|
| 6,850,969 B2 * | 2/2005 | Ladan-Mozes et al. | 709/213 |
| 6,996,682 B1 * | 2/2006 | Milligan et al. | 711/141 |
| 7,366,825 B2 * | 4/2008 | Williams et al. | 711/103 |
| 7,543,100 B2 | 6/2009 | Singhal et al. | |
| 7,610,438 B2 * | 10/2009 | Lee et al. | 711/103 |
| 7,634,627 B1 * | 12/2009 | Ohr et al. | 711/162 |
| 7,650,458 B2 * | 1/2010 | Rogers et al. | 711/103 |
| 7,685,126 B2 * | 3/2010 | Patel et al. | 707/770 |
| 7,694,091 B2 * | 4/2010 | Andrewartha et al. | 711/162 |
| 7,702,849 B2 * | 4/2010 | Saarinen et al. | 711/112 |
| 7,739,312 B2 * | 6/2010 | Gordon et al. | 707/802 |
| 7,773,420 B2 * | 8/2010 | Kim | 365/185.08 |
| 7,836,018 B2 * | 11/2010 | Oliveira et al. | 707/634 |
| 7,870,327 B1 * | 1/2011 | Cornwell et al. | 711/103 |
| 7,904,640 B2 * | 3/2011 | Yano et al. | 711/103 |
| 7,913,032 B1 * | 3/2011 | Cornwell et al. | 711/103 |
| 7,917,803 B2 * | 3/2011 | Stefanus et al. | 711/149 |
| 7,978,516 B2 * | 7/2011 | Olbrich et al. | 365/185.11 |
| 8,074,011 B2 * | 12/2011 | Flynn et al. | 711/103 |
| 2007/0073989 A1 * | 3/2007 | Sharma et al. | 711/165 |
| 2007/0168633 A1 * | 7/2007 | English et al. | 711/165 |
| 2009/0019245 A1 * | 1/2009 | Bondurant et al. | 711/161 |
| 2009/0198902 A1 * | 8/2009 | Khmelnitsky et al. | 711/135 |
| 2009/0198947 A1 * | 8/2009 | Khmelnitsky et al. | 711/202 |
| 2009/0198952 A1 * | 8/2009 | Khmelnitsky et al. | 711/206 |
| 2010/0030827 A1 * | 2/2010 | Sarakas | 707/204 |
| 2010/0042790 A1 * | 2/2010 | Mondal et al. | 711/161 |
| 2010/0070735 A1 * | 3/2010 | Chen et al. | 711/206 |
| 2010/0106895 A1 * | 4/2010 | Condit et al. | 711/103 |
| 2010/0228800 A1 * | 9/2010 | Aston et al. | 707/822 |
| 2010/0281230 A1 * | 11/2010 | Rabii et al. | 711/165 |
| 2011/0022780 A1 * | 1/2011 | Wakrat et al. | 711/103 |
| 2011/0238886 A1 * | 9/2011 | Post et al. | 711/103 |

OTHER PUBLICATIONS

Kazmi, A., "PCI Express™ Basics & Applications in Communication Systems," PCI-SIG Developers Conference, 2004 (50 pages).

(Continued)

*Primary Examiner* — Edward Dudek, Jr.
*Assistant Examiner* — Christopher Birkhimer
(74) *Attorney, Agent, or Firm* — Osha Liang LLP

(57) ABSTRACT

A method for storing data, including receiving a request to write a first datum defined using a first object ID and a first offset ID to persistent storage. The method further including determining a first physical address in the persistent storage, where the first physical address comprises a first block ID and first sub block ID. The method further includes writing the first datum to the first physical address, generating a first table of contents entry (TE) comprising the first object ID, the first offset ID, and the first sub block ID, and writing the first TE to a second physical address in the persistent storage, where the second physical address comprises the first block ID and a second sub block ID corresponding to the second sub block ID, and where the second sub block is located within a first block corresponding to the first block ID.

22 Claims, 21 Drawing Sheets

OTHER PUBLICATIONS

Percival, D., "Multicast Over PCI Express®," PCI-SIG Developer's Conference Europe, 2009 (33 pages).

Huffman, A., NVM Express Revision 1.0b, Jul. 12, 2011 (126 pages).
Regula, J., Using Non-transparent Bridging in PCI Express Systems, Jun. 1, 2004 (31 pages).

* cited by examiner

TOC Entry (430) | Object ID 432 | Birth time 434 | Offset ID 436 | Fragment Size 438 | Page ID 440 | Byte 442 | Logical Length 444 | Type 446 | Kind 448 | Reserved 450

FIG. 4F

STORAGE SYSTEM WITH SELF DESCRIBING DATA

BACKGROUND

The speed at which a system can write data to persistent storage and read data from persistent storage is often a critical factor in the overall performance of the system. The traditional approach to reading data from and writing data to persistent storage requires processing by multiple layers in the system kernel and by multiple entities in the hardware. As a result, reading data from and writing data to persistent storage introduces significant latency in the system and, consequently, reduces the overall performance of the system.

SUMMARY

In general, in one aspect, a method for storing data. The method including receiving a request to write a first datum to persistent storage, wherein the first datum is defined using a first logical address, determining a first physical address in the persistent storage, wherein the first physical address comprises a first block ID and first sub block ID, writing the first datum to the first physical address, generating a first table of contents entry (TE) comprising the first logical address, and the first sub block ID, and writing the first TE to a second physical address in the persistent storage, wherein the second physical address comprises the first block ID and a second sub block ID, wherein a second sub block corresponds to the second sub block ID, and wherein the second sub block is located within a first block corresponding to the first block ID.

In general, in one aspect, the invention relates to a method for storing data, comprising receiving a request to write a first datum to persistent storage, wherein the first datum is defined using a first logical address, determining a first physical address in persistent storage, wherein the first physical address comprises a first block ID and a first page ID, writing a first frag comprising a copy of the first datum to the first physical address, generating a first table of contents entry (TE) comprising the first logical address, and the first page ID, receiving a request to write a second datum to the persistent storage, wherein the second datum is defined using a second logical address, determining a second physical address in the persistent storage, wherein the second physical address comprises the first block ID and a second page ID, writing a second frag comprising a copy of the second datum to the second physical address, generating a second TE comprising the first logical address, and the second page ID, generating a table of contents (TOC) page, wherein the TOC page comprises the first TE and the second TE, and writing the TOC page to a third physical address in the persistent storage, wherein the third physical address comprises the first block ID and a third page ID.

In general, in one aspect, the invention relates to a method for populating an in-memory datum structure. The method includes (a) selecting a first block in a persistent storage, (b) extracting a last page in the first block, wherein the first block is associated with a first block ID, (c) extracting a first table of contents entry (TE) from the last page in the first block, wherein the first TE comprises a first logical address for a first datum, and a first page ID corresponding to a page in the first block in which the first datum is located, (d) generating a first physical address for the first datum using the first block ID, and the first page ID, (e) hashing the first logical address to obtain a first hash value, and (f) populating the in-memory data structure with a first mapping between the first hash value and the first physical address.

Other aspects of the invention will be apparent from the following description and the appended claims.

BRIEF DESCRIPTION OF DRAWINGS

FIG. 4F shows a table of contents (TOC) entry in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a storage system. More specifically, embodiments of the invention relate to a storage system that includes self describing data. Further, embodiments of the invention relate to a storage system in which all metadata required to access the user data stored in the storage system is located with the user data it is describing. Additionally, the metadata is used to populate an in-memory data structure that allows the storage system to directly access the user data using only the in-memory data structure.

Figure 1A:
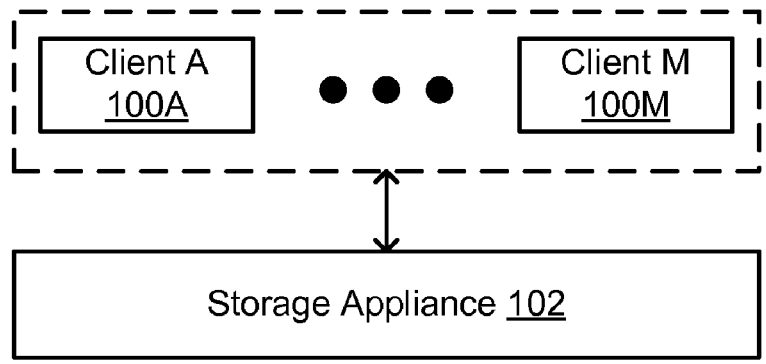
FIGS. 1A-1E show systems in accordance with one or more embodiments of the invention.

FIGS. 1A-1E show systems in accordance with one or more embodiments of the invention. Referring to FIG. 1A, the system includes one or more clients (client A (100A), client M (100M)) operatively connected to a storage appliance (102).

In one embodiment of the invention, clients (100A, 100M) correspond to any system that includes functionality to issue a read request to the storage appliance (102) and/or issue a write request to the storage appliance (102). Though not shown in FIG. 1A, each of the clients (100A, 100M) may include a client processor and client memory. Additional details about components in a client are described in FIG. 1D below. In one embodiment of the invention, the clients (100A, 100M) are configured to communicate with the storage appliance (102) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the invention is not limited to the aforementioned protocols.

In one or more embodiments of the invention, if the client implements PCI, PCI-express, or NVMe, then the client includes a root complex (not shown). In one embodiment of the invention, the root complex is a device that connects the client processor and client memory to the PCIe Fabric. In one embodiment of the invention, the root complex is integrated into the client processor.

Figure 1B:
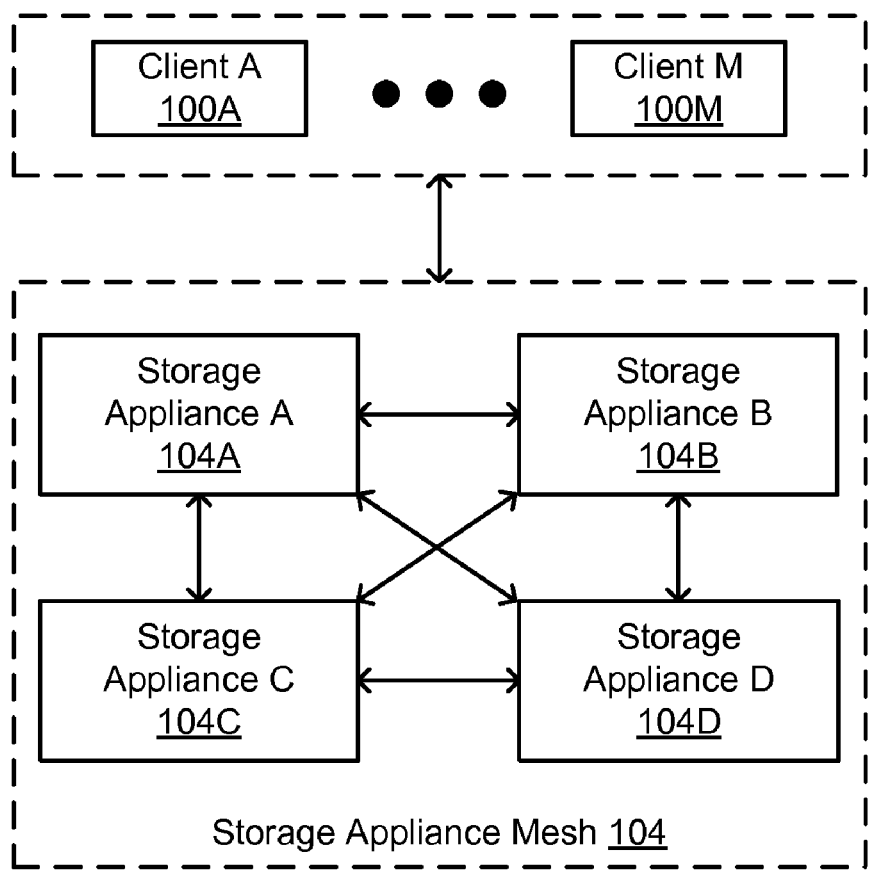
Figure 1C:
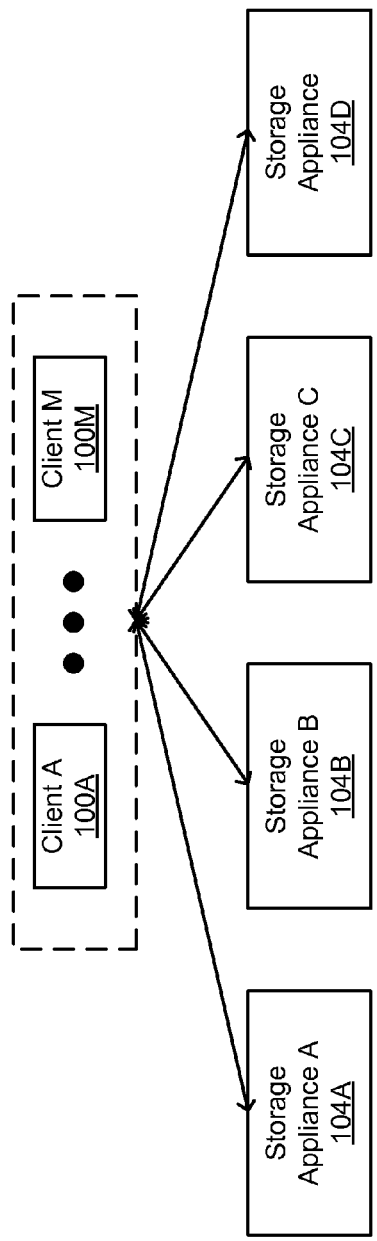
Figure 1D:
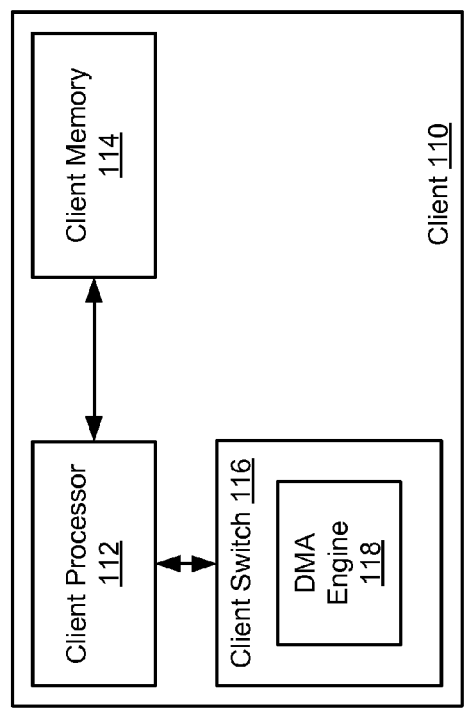
Figure 2A:
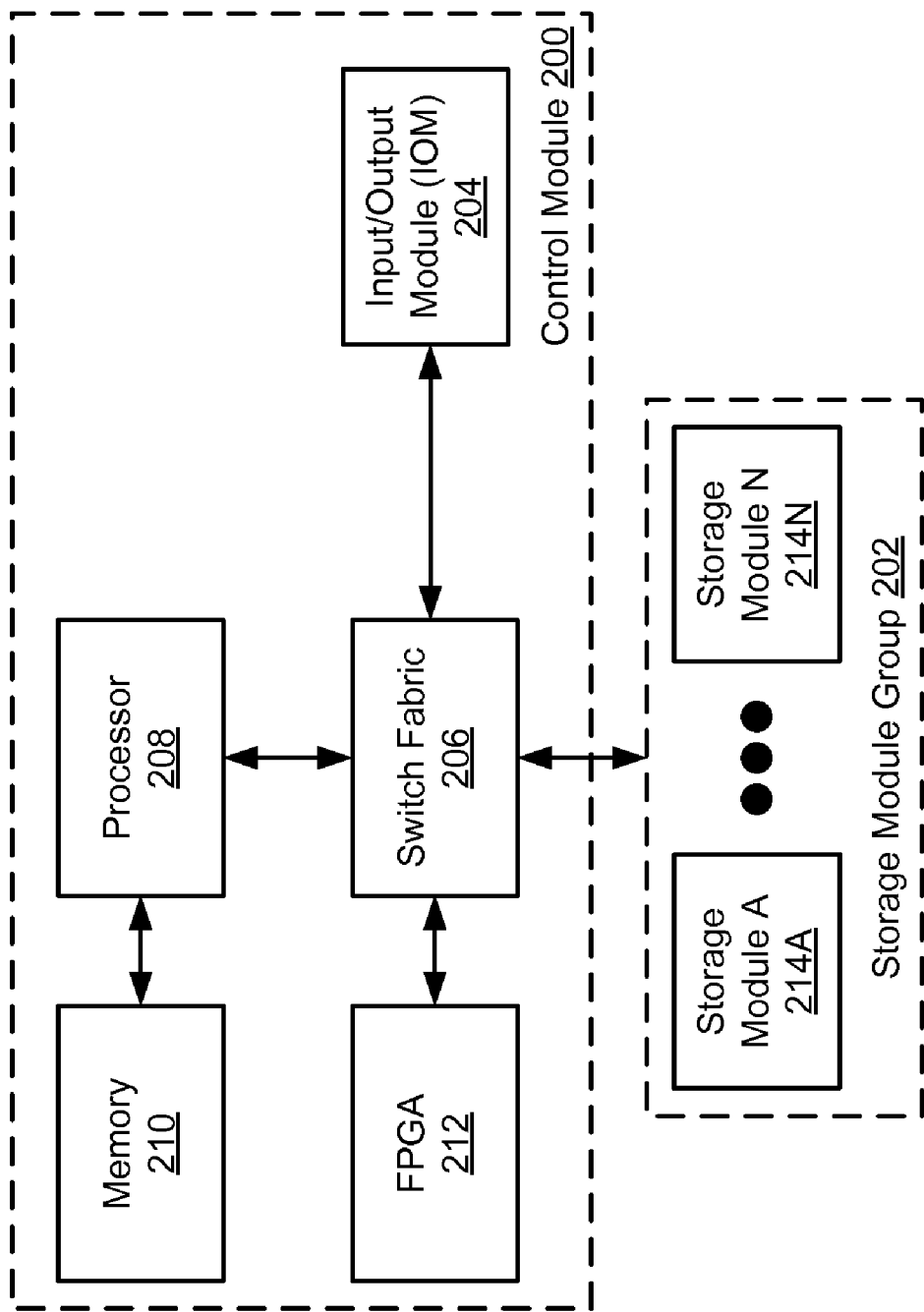
FIGS. 2A-2D show storage appliances in accordance with one or more embodiments of the invention.

In one embodiment of the invention, the PCIe Fabric includes root complexes and endpoints which are connected via switches (e.g., client switch (116) in FIG. 1D and switches within the switch fabric, e.g., switch fabric (206) in FIG. 2A). In one embodiment of the invention, an endpoint is a device other than a root complex or a switch that can originate PCI transactions (e.g., read request, write request) or that is a target of PCI transactions.

In one embodiment of the invention, a single client and a single storage appliance may be considered part of a single PCIe Fabric. In another embodiment of the invention, any combination of one or more clients and one or more storage appliances may be considered part of a single PCIe Fabric. Further, if the individual components within the storage appliance communicate using PCIe, and individual components in the client (see FIG. 1D) communicate using PCIe, then all the components in the storage appliance and the client may be considered part of a single PCIe Fabric. Those skilled in the art will appreciate that various embodiments of the invention may be implemented using another type of fabric without departing from the invention.

Continuing with FIG. 1A, in one embodiment of the invention, the storage appliance (102) is a system that includes volatile and persistent storage and is configured to service read requests and/or write requests from one or more clients (100A, 100M). Various embodiments of the storage appliance (102) are described below in FIGS. 2A-2D.

Referring to FIG. 1B, FIG. 1B shows a system in which clients (100A, 100M) are connected to multiple storage appliances (104A, 104B, 104C, 104D) arranged in a mesh configuration (denoted as storage appliance mesh (104) in FIG. 1B). As shown in FIG. 1B, the storage appliance mesh (104) is shown in a fully-connected mesh configuration—that is, every storage appliance (104A, 104B, 104C, 104D) in the storage appliance mesh (104) is directly connected to every other storage appliance (104A, 104B, 104C, 104D) in the storage appliance mesh (104). In one embodiment of the invention, each of the clients (100A, 100M) may be directly connected to one or more storage appliances (104A, 104B, 104C, 104D) in the storage appliance mesh (104). Those skilled in the art will appreciate that the storage appliance mesh may be implemented using other mesh configurations (e.g., partially connected mesh) without departing from the invention.

Referring to FIG. 1C, FIG. 1C shows a system in which clients (100A, 100M) are connected to multiple storage appliances (104A, 104B, 104C, 104D) arranged in a fan-out configuration. In this configuration, each client (100A, 100M) is connected to one or more of the storage appliances (104A, 104B, 104C, 104D); however, there is no communication between the individual storage appliances (104A, 104B, 104C, 104D).

Referring to FIG. 1D, FIG. 1D shows a client in accordance with one or more embodiments of the invention. As shown in FIG. 1D, the client (110) includes a client processor (112), client memory (114), and a client switch (116). Each of these components is described below.

In one embodiment of the invention, the client processor (112) is a group of electronic circuits with a single core or multiple cores that are configured to execute instructions. In one embodiment of the invention, the client processor (112) may be implemented using a Complex Instruction Set (CISC) Architecture or a Reduced Instruction Set (RISC) Architecture. In one or more embodiments of the invention, the client processor (112) includes a root complex (as defined by the PCIe protocol) (not shown). In one embodiment of the invention, if the client (110) includes a root complex (which may be integrated into the client processor (112)) then the client memory (114) is connected to the client processor (112) via the root complex. Alternatively, the client memory (114) is directly connected to the client processor (112) using another point-to-point connection mechanism. In one embodiment of the invention, the client memory (114) corresponds to any volatile memory including, but not limited to, Dynamic Random-Access Memory (DRAM), Synchronous DRAM, SDR SDRAM, and DDR SDRAM.

In one embodiment of the invention, the client memory (114) includes one or more of the following: a submission queue for the client processor and a completion queue for the client processor. In one embodiment of the invention, the storage appliance memory includes one or more submission queues for client processors visible to a client through the fabric, and the client memory includes one or more completion queues for the client processor visible to the storage appliance through the fabric. In one embodiment of the invention, the submission queue for the client processor is used to send commands (e.g., read request, write request) to the client processor. In one embodiment of the invention, the completion queue for the client processor is used to signal the client processor that a command it issued to another entity has been completed. Embodiments of the invention may be implemented using other notification mechanisms without departing from the invention.

In one embodiment of the invention, the client switch (116) includes only a single switch. In another embodiment of the invention, the client switch (116) includes multiple interconnected switches. If the client switch (116) includes multiple switches, each switch may be connected to every other switch, may be connected to a subset of the switches in the switch fabric, or may only be connected to one other switch. In one embodiment of the invention, each of the switches in the client switch (116) is a combination of hardware and logic (implemented, for example, using integrated circuits) (as defined by the protocol(s) the switch fabric implements) that is configured to permit data and messages to be transferred between the client (110) and the storage appliances (not shown).

In one embodiment of the invention, when the clients (100A, 100M) implement one or more of the following protocols PCI, PCIe, or PCI-X, the client switch (116) is a PCI switch.

In such embodiments, the client switch (116) includes a number of ports, where each port may be configured as a transparent bridge or a non-transparent bridge. Ports implemented as transparent bridges allow the root complex to continue discovery of devices (which may be other root complexes, switches, PCI bridges, or endpoints) connected (directly or indirectly) to the port. In contrast, when a root complex encounters a port implemented as a non-transparent bridge, the root complex is not able to continue discovery of devices connected to the port—rather, the root complex treats such a port as an endpoint.

When a port is implemented as a non-transparent bridge, devices on either side of the non-transparent bridge may only communicate using a mailbox system and doorbell interrupts (implemented by the client switch). The doorbell interrupts allow a processor on one side of the non-transparent bridge to issue an interrupt to a processor on the other side of the non-transparent bridge. Further, the mailbox system includes one or more registers that are readable and writeable by processors on either side of the switch fabric. The aforementioned registers enable processors on either side of the client switch to pass control and status information across the non-transparent bridge.

In one embodiment of the invention, in order to send a PCI transaction from a device on one side of the non-transparent bridge to a device on the other side of the non-transparent bridge, the PCI transaction must be addressed to the port implementing the non-transparent bridge. Upon receipt of the PCI transaction, the client switch performs an address translation (either using a direct address translation mechanism or a look-up table based translation mechanism). The resulting address is then used to route the packet towards the appropriate device on the other side of the non-transparent bridge.

In one embodiment of the invention, the client switch (116) is configured such that at least a portion of the client memory (114) is directly accessible to the storage appliance. Said another way, a storage appliance on one side of the client switch may directly access, via the client switch, client memory on the other side of the client switch.

In one embodiment of the invention, the client switch (116) includes a DMA engine (118). In one embodiment of the invention, the DMA engine (118) may be programmed by either the client processor or a storage appliance connected to the client switch. As discussed above, the client switch (116) is configured such that at least a portion of the client memory (114) is accessible to the storage appliance or storage modules. Accordingly, the DMA engine (118) may be programmed to read data from an address in the portion of the client memory that is accessible to the storage appliance and directly write a copy of such data to memory in the storage appliance or storage modules. Further, the DMA engine (118) may be programmed to read data from the storage appliance and directly write a copy of such data to an address in the portion of the client memory that is accessible to the storage appliance.

In one embodiment of the invention, the DMA engine (118) supports multicasting. In such embodiments, a processor in the storage appliance (see FIG. 2A) may create a multicast group, where each member of the multicast group corresponds to a unique destination address in memory on the storage appliance. Each member of the multicast group is associated with a descriptor that specifies: (i) the destination address; (ii) the source address; (iii) the transfer size field; and (iv) a control field. The source address for each of the descriptors remains constant while the destination address changes for each descriptor. Once the multicast group is created, any data transfer through the switch targeting the multicast group address, including a transfer initiated by a DMA engine, places an identical copy of the data in all of the destination ports associated with the multicast group. In one embodiment of the invention, the switch processes all of the multicast group descriptors in parallel.

Continuing with the discussion of FIG. 1D, those skilled in the art will appreciate that while FIG. 1D shows a client switch (116) located in the client (110), the client switch (116) may be located external to the client without departing from the invention. Further, those skilled in the art will appreciate that the DMA engine (118) may be located external to the client switch (116) without departing from the invention.

Figure 1E:
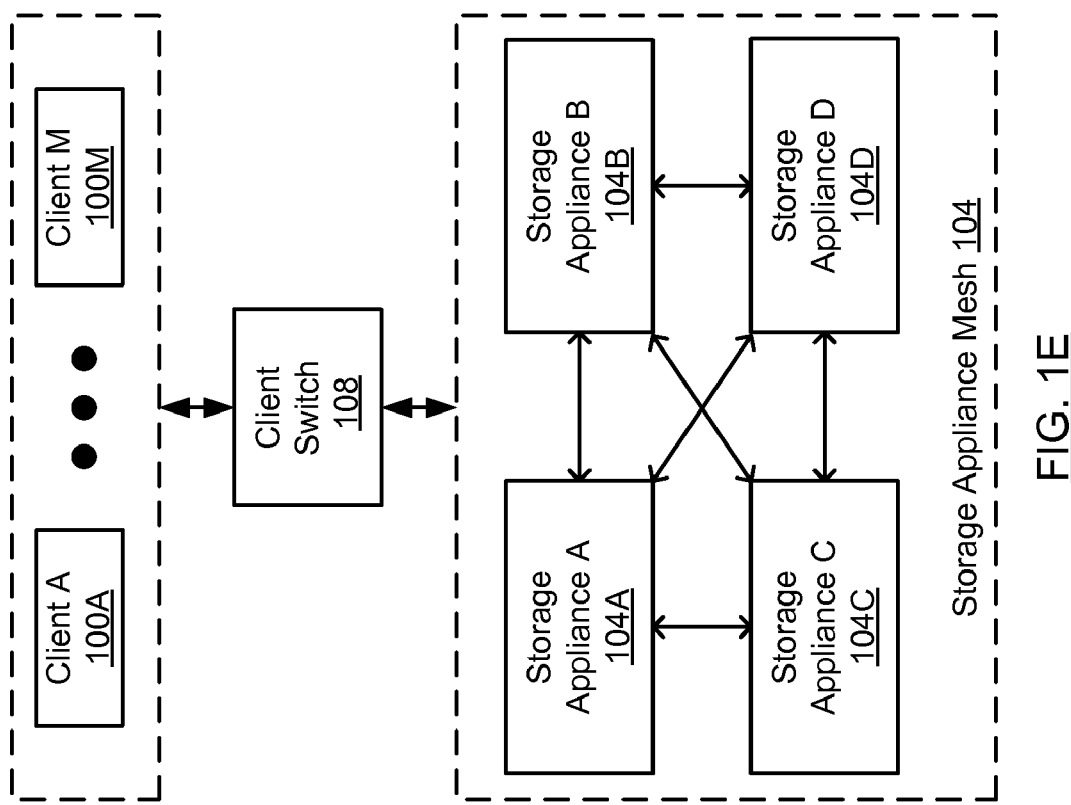

Referring FIG. 1E, FIG. 1E shows a system in which clients (100A, 100M) are connected, via a client switch (108), to multiple storage appliances (104A, 104B, 104C, 104D) arranged in a mesh configuration (denoted as storage appliance mesh (104) in FIG. 1E). In the embodiment shown in FIG. 1E, each client (100A, 100M) does not include its own client switch—rather, all of the clients share a client switch (108). As shown in FIG. 1E, the storage appliance mesh (104) is shown in a fully-connected mesh configuration—that is, every storage appliance (104A, 104B, 104C, 104D) in the storage appliance mesh (104) is directly connected to every other storage appliance (104A, 104B, 104C, 104D) in the storage appliance mesh (104). In one embodiment of the invention, the client switch (108) may be directly connected to one or more storage appliances (104A, 104B, 104C, 104D) in the storage appliance mesh (104). Those skilled in the art will appreciate that storage appliance mesh may be implemented using other mesh configurations (e.g., partially connected mesh) without departing from the invention.

Though not shown in FIG. 1E, each client may include its own client switch (as shown in FIG. 1D) but may be connected to the storage appliance mesh (104) using a switch fabric (defined below).

Those skilled in the art will appreciate that while FIGS. 1A-1E show storage appliances connected to a limited number of clients, the storage appliances may be connected to any number of clients without departing from the invention. Those skilled in the art will appreciate that while FIGS. 1A-1E show various system configurations, the invention is not limited to the aforementioned system configurations. Further, those skilled in the art will appreciate that the clients (regardless of the configuration of the system) may be connected to the storage appliance(s) using a switch fabric (not shown) (described below) without departing from the invention.

FIGS. 2A-2D show embodiments of storage appliances in accordance with one or more embodiments of the invention. Referring to FIG. 2A, the storage appliance includes a control module (200) and a storage module group (202). Each of these components is described below. In general, the control module (200) is configured to manage the servicing of read and write requests from one or more clients. In particular, the control module is configured to receive requests from one or more clients via the IOM (discussed below), to process the request (which may include sending the request to the storage module), and to provide a response to the client after the request has been serviced. Additional details about the components in the control module are included below. Further, the operation of the control module with respect to servicing read and write requests is described below with reference to FIGS. 4A-7C.

Continuing with the discussion of FIG. 2A, in one embodiment of the invention, the control module (200) includes an Input/Output Module (IOM) (204), a switch fabric (206), a processor (208), a memory (210), and, optionally, a Field Programmable Gate Array (FPGA) (212). In one embodiment of the invention, the IOM (204) is the physical interface between the clients (100A, 100M in FIGS. 1A-1E) and the other components in the storage appliance. The IOM supports one or more of the following protocols: PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE). Those skilled in the art will appreciate that the IOM may be implemented using protocols other than those listed above without departing from the invention.

Continuing with the discussion of FIG. 2A, the switch fabric (206) includes only a single switch. In another embodiment of the invention, the switch fabric (206) includes multiple interconnected switches. If the switch fabric (206) includes multiple switches, each switch may be connected to every other switch, may be connected to a subset of switches in the switch fabric, or may only be connected to one other switch in the switch fabric. In one embodiment of the invention, each of the switches in the switch fabric (206) is a combination of hardware and logic (implemented, for example, using integrated circuits) (as defined by the protocol(s) the switch fabric implements) that is configured to connect various components together in the storage appliance and to route packets (using the logic) between the various connected components. In one embodiment of the invention, the switch fabric (206) is physically connected to the IOM (204), processor (208), storage module group (202), and, if present, the FPGA (212). In one embodiment of the invention, all inter-component communication in the control module (200) (except between the processor (208) and memory (210)) passes through the switch fabric (206). Further, all communication between the control module (200) and the storage module group (202) passes through the switch fabric (206). In one embodiment of the invention, the switch fabric (206) is implemented using a PCI protocol (e.g., PCI, PCIe, PCI-X, or another PCI protocol). In such embodiments, all communication that passes through the switch fabric (206) uses the corresponding PCI protocol.

In one embodiment of the invention, if the switch fabric implements a PCI protocol, the switch fabric (206) includes a port for the processor (or, more specifically, a port for the root complex integrated in the processor (208) or for the root complex connected to the processor), one or more ports for storage modules (214A, 214N) (see FIG. 3) in the storage module group (202), a port for the FPGA (212) (if present), and a port for the IOM (204). In one or more embodiments of the invention, each of the aforementioned ports may be configured as a transparent bridge or a non-transparent bridge (as discussed above). Those skilled in the art will appreciate that while the switch fabric (206) has been described with respect to a PCI implementation, the switch fabric (206) may be implemented using other protocols without departing from the invention.

In one embodiment of the invention, at least one switch in the switch fabric (206) is configured to implement multicasting. More specifically, in one embodiment of the invention, the processor (208) is configured to generate a multicast group where the multicast group includes two or more member with each member specifying an address in the memory (210) and/or in the storage modules (214A, 214N). When the multicast group is created, the multicast group is associated with a multicast address. In order to implement the multicasting, at least one switch in the switch fabric is configured that when a write specifying the multicast address as the destination address is received, the switch is configured to generate a new write for each member in the multicast group and issue the writes to the appropriate address in the storage appliance. In one embodiment of the invention, the address for each write generated by the switch is determined by adding a particular offset to the multicast address.

Continuing with FIG. 2A, the processor (208) is a group of electronic circuits with a single core or multi-cores that are configured to execute instructions. In one embodiment of the invention, the processor (208) may be implemented using a Complex Instruction Set (CISC) Architecture or a Reduced Instruction Set (RISC) Architecture. In one or more embodiments of the invention, the processor (208) includes a root complex (as defined by the PCIe protocol). In one embodiment of the invention, if the control module (200) includes a root complex (which may be integrated into the processor (208)) then the memory (210) is connected to the processor (208) via the root complex. Alternatively, the memory (210) is directly connected to the processor (208) using another point-to-point connection mechanism. In one embodiment of the invention, the memory (210) corresponds to any volatile memory including, but not limited to, Dynamic Random-Access Memory (DRAM), Synchronous DRAM, SDR SDRAM, and DDR SDRAM.

In one embodiment of the invention, the processor (208) is configured to create and update an in-memory data structure (not shown), where the in-memory data structure is stored in the memory (210). In one embodiment of the invention, the in-memory data structure includes mappings (direct or indirect) between logical addresses and physical storage addresses in the set of storage modules. In one embodiment of the invention, the logical address is an address at which the data appears to reside from the perspective of the client. In one embodiment of the invention, the logical address is (or includes) a hash value generated by applying a hash function (e.g. SHA-1, MD-5, etc.) to an n-tuple. In one embodiment of the invention, the n-tuple is <object ID, offset ID>, where the object ID defines a file and the offset ID defines a location relative to the starting address of the file. In another embodiment of the invention, the n-tuple is <object ID, offset ID, birth time>, where the birth time corresponds to the time when the file (identified using the object ID) was created. Alternatively, the logical address may include a logical object ID and a logical byte address, or a logical object ID and a logical address offset. In another embodiment of the invention, the logical address includes an object ID and an offset ID. Those skilled in the art will appreciate that multiple logical addresses may be mapped to a single physical address and that the logical address is not limited to the above embodiments.

Figure 3:
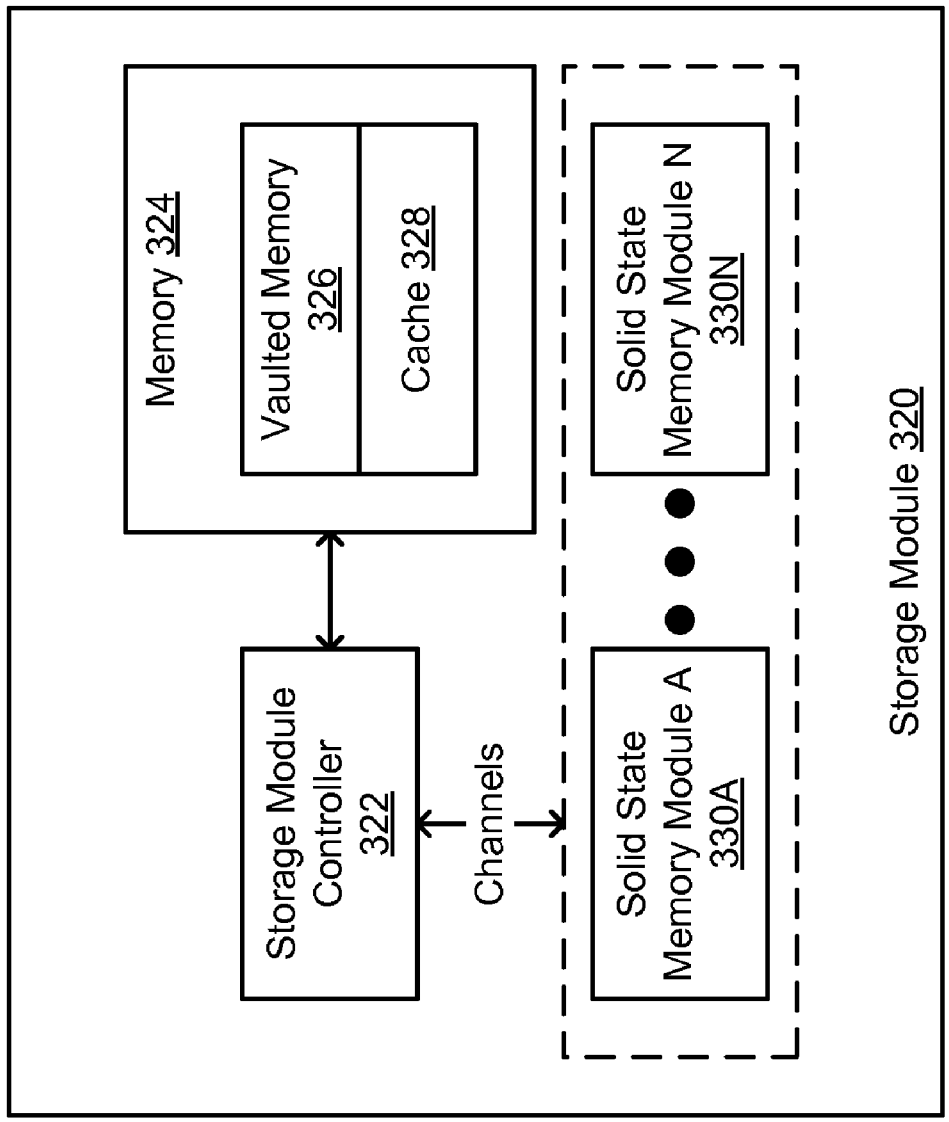
FIG. 3 shows a storage module in accordance with one or more embodiments of the invention.

In one embodiment of the invention, the physical address may correspond to (i) a location in the memory (210), (ii) a location in the vaulted memory (e.g., 324 in FIG. 3), or (iii) a location in a solid state memory module (e.g., 330A in FIG. 3). In one embodiment of the invention, the in-memory data structure may map a single hash value to multiple physical addresses if there are multiple copies of the data in the storage appliance.

In one embodiment of the invention, the memory (210) includes one or more of the following: a submission queue for the processor, a completion queue for the processor, a submission queue for each of the storage modules in the storage appliance and a completion queue for each of the storage modules in the storage appliance. In one embodiment of the invention, the submission queue for the processor is used to send commands (e.g., read request, write request) to the processor. In one embodiment of the invention, the completion queue for the processor is used to signal the processor that a command it issued to another entity has been completed. The submission and completion queues for the storage modules function in a similar manner.

In one embodiment of the invention, the processor (via the switch fabric) is configured to offload various types of processing to the FPGA (212). In one embodiment of the invention, the FPGA (212) includes functionality to calculate checksums for data that is being written to the storage module(s) and/or data that is being read from the storage module(s). Further, the FPGA (212) may include functionality to calculate P and/or Q parity information for purposes of storing data in the storage module(s) using a RAID scheme (e.g., RAID 2-RAID 6) and/or functionality to perform various calculations necessary to recover corrupted data stored using a RAID scheme (e.g., RAID 2-RAID 6). In one embodiment of the invention, the storage module group (202) includes one or more storage modules (214A, 214N) each configured to store data. Storage modules are described below in FIG. 3.

In one embodiment of the invention, the processor (208) is configured to program one or more DMA engines in the system. For example, the processor (208) is configured to program the DMA engine in the client switch (see FIG. 1D). The processor (208) may also be configured to program the DMA engine in the storage module (see FIG. 3). In one embodiment of the invention, programming the DMA engine in the client switch may include creating a multicast group and generating descriptors for each of the members in the multicast group.

Figure 2B:
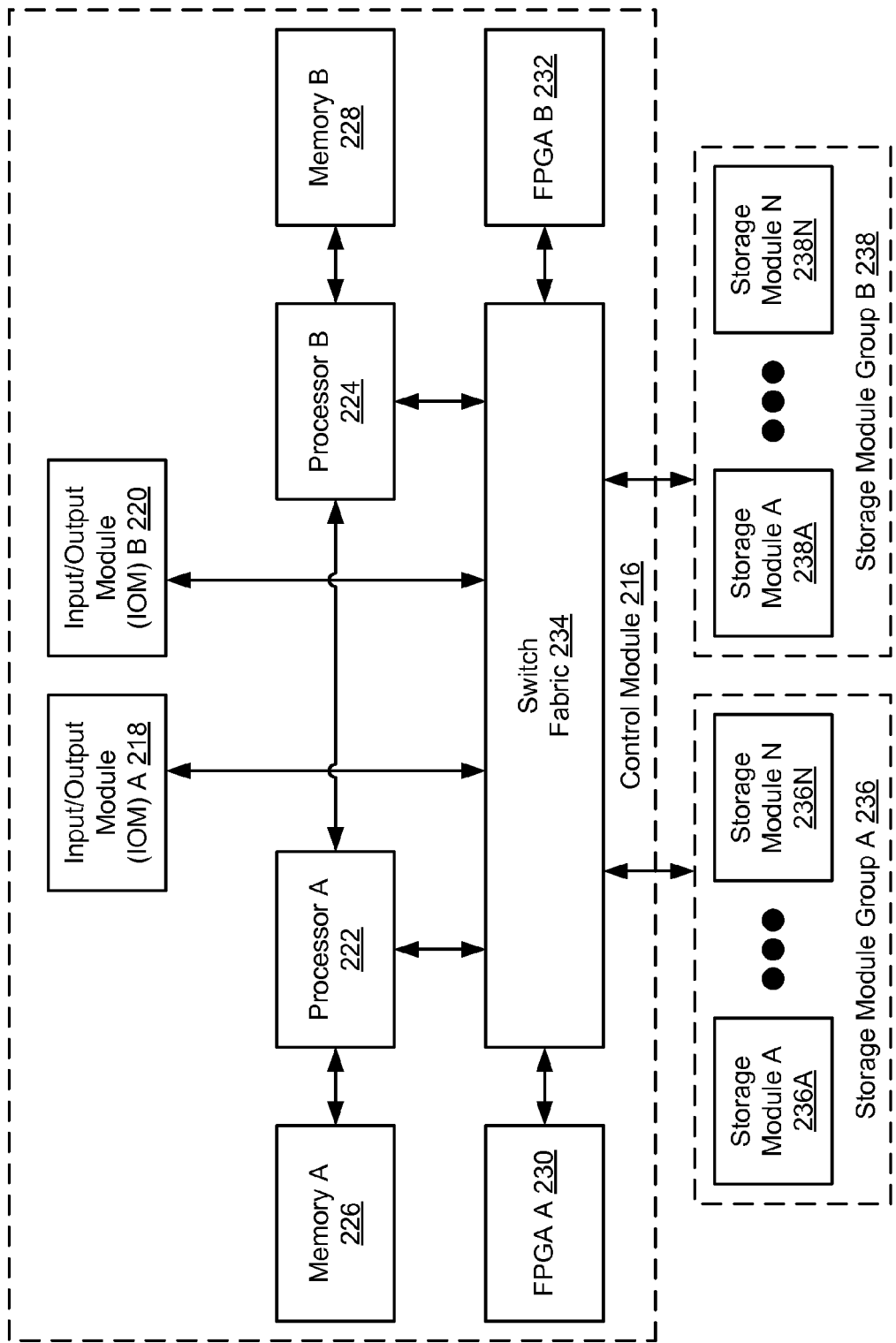

Turning to FIG. 2B, FIG. 2B shows a storage appliance in accordance with one or more embodiments of the invention. The storage appliance includes a control module (216) and at least two storage module groups (236, 238). The control module (216) includes a switch fabric (234), which is directly connected to IOM A (218), IOM B (220), processor A (222), processor B (224), (if present) FPGA A (230), (if present) FPGA B (232), storage modules (236A, 236N) in storage module group A (236) and storage modules (238A, 238N) in storage module group B (238). All communication between the aforementioned components (except between processor A (222) and processor B (224)) passes through the switch fabric (234). In one embodiment of the invention, processors (222, 224) within the control module (216) are able to directly communicate using, for example, point-to-point interconnect such as Intel® QuickPath Interconnect. Those skilled in the art will appreciate that other point-to-point communication mechanisms may be used to permit direct communication between the processor (222, 224) without departing from the invention.

Continuing with FIG. 2B, in one embodiment of the invention, the control module (216) is substantially similar to the control module (200) in FIG. 2A. In one embodiment of the invention, the switch fabric (234) is substantially similar to the switch fabric (206) in FIG. 2A. In one embodiment of the invention, each processor (222, 224) is substantially similar to the processor (208) in FIG. 2A. In one embodiment of the invention, the memory (226, 228) is substantially similar to the memory (210) in FIG. 2A. In one embodiment of the invention, the IOMs (218, 220) are substantially similar to the IOM (204) in FIG. 2A. In one embodiment of the invention, the FPGAs (230, 232) are substantially similar to the FPGA (212) in FIG. 2A. Finally, the storage module groups (236, 238) are substantially similar to the storage module group (202) in FIG. 2A.

In one embodiment of the invention, the two IOMs (218, 220) in the control module (216) double the I/O bandwidth for the control module (216) (over the I/O bandwidth of a control module with a single IOM). Moreover, the addition of a second IOM (or additional IOMs) increases the number of clients that may be connected to a given control module and, by extension, the number of clients that can be connected to a storage appliance. In one embodiment of the invention, the use of the switch fabric (234) to handle communication between the various connected components (described above) allows each of the processors (222, 224) to directly access (via the switch fabric (234)) all FPGAs (230, 232) and all storage modules (236A, 236N, 238A, 238N) connected to the switch fabric (234).

Figure 2C:
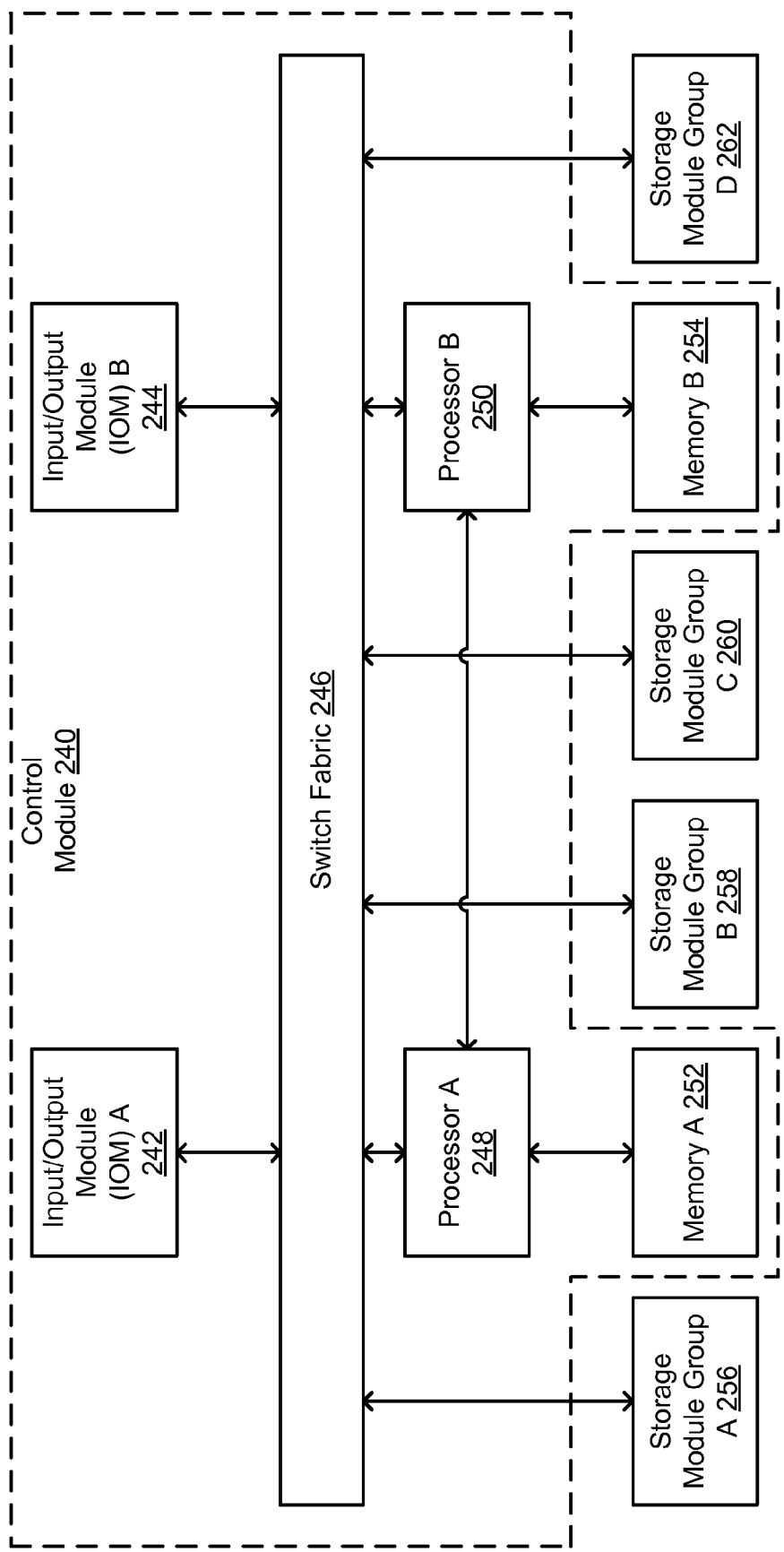

Referring to FIG. 2C, FIG. 2C shows a storage appliance that includes a control module (240) connected (via a switch fabric (246)) to multiple storage modules (not shown) in the storage module groups (256, 258, 260, 262). As shown in FIG. 2C, the control module (240) includes two IOMs (242, 244), two processors (248, 250), and memory (252, 254). In one embodiment of the invention, all components in the control module (240) communicate via the switch fabric (246). In addition, the processors (248, 250) may communicate with each other using the switch fabric (246) or a direct connection (as shown in FIG. 2C). In one embodiment of the invention, the processors (248, 250) within the control module (240) are able to directly communicate using, for example, a point-to-point interconnect such as Intel® QuickPath Interconnect. Those skilled in the art will appreciate that other point-to-point communication mechanisms may be used to permit direct communication between the processors (248, 250) without departing from the invention.

In one embodiment of the invention, processor A (248) is configured to primarily handle requests related to the storage and retrieval of data from storage module groups A and B (256, 258) while processor B (250) is configured to primarily handle requests related to the storage and retrieval of data from storage module groups C and D (260, 262). However, the processors (248, 250) are configured to communicate (via the switch fabric (246)) with all of the storage module groups (256, 258, 260, 262). This configuration enables the control module (240) to spread the processing of I/O requests between the processors and/or provides built-in redundancy to handle the scenario in which one of the processors fails.

Continuing with FIG. 2C, in one embodiment of the invention, the control module (240) is substantially similar to the control module (200) in FIG. 2A. In one embodiment of the invention, the switch fabric (246) is substantially similar to the switch fabric (206) in FIG. 2A. In one embodiment of the invention, each processor (248, 250) is substantially similar to the processor (208) in FIG. 2A. In one embodiment of the invention, the memory (252, 254) is substantially similar to the memory (210) in FIG. 2A. In one embodiment of the invention, the IOMs (242, 244) are substantially similar to the IOM (204) in FIG. 2A. Finally, the storage module groups (256, 258, 260, 262) are substantially similar to the storage module group (202) in FIG. 2A.

Figure 2D:
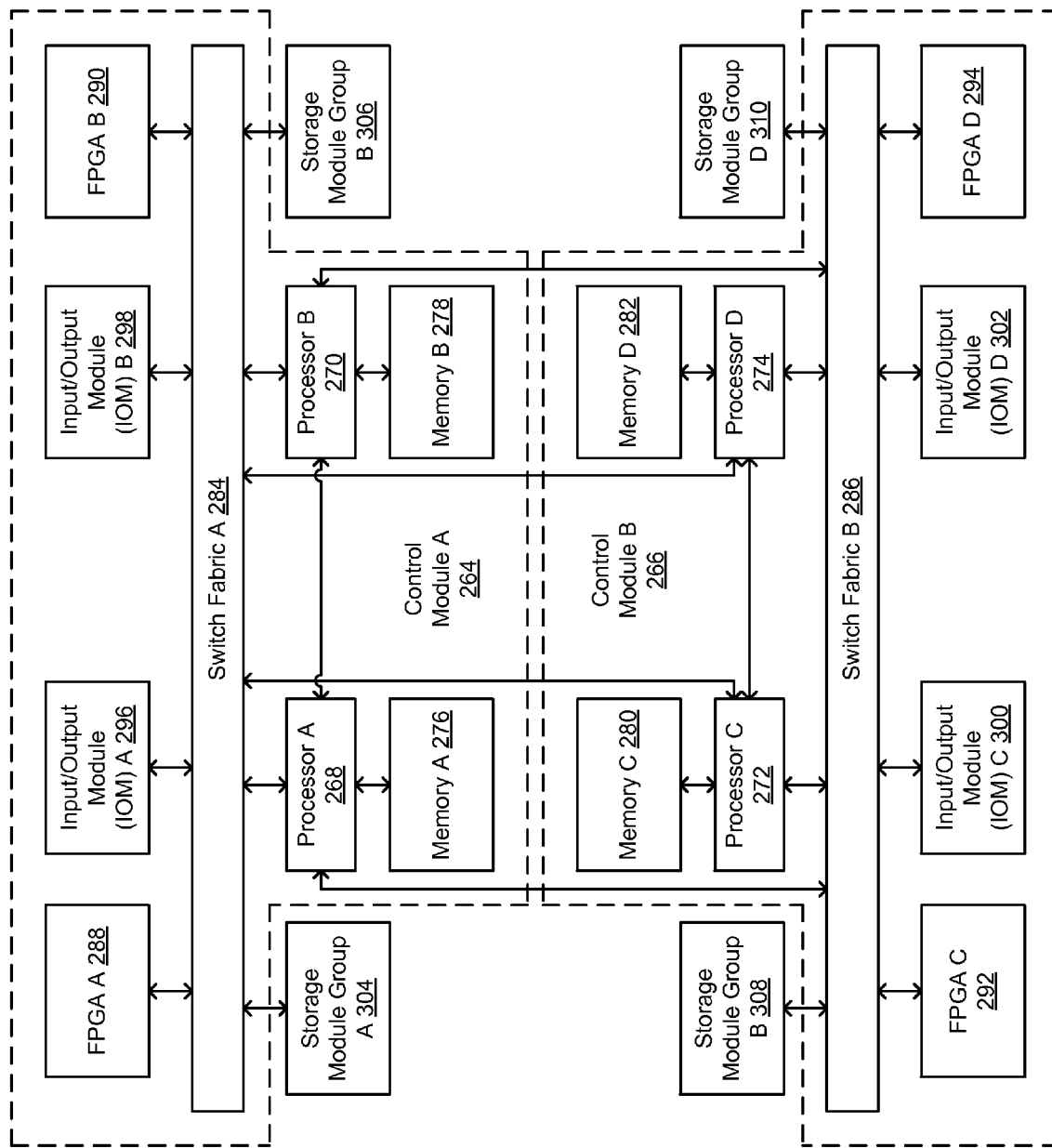

Referring to FIG. 2D, FIG. 2D shows a storage appliance that includes two control modules (264, 266). Each control module includes IOMs (296, 298, 300, 302), processors (268,

270, 272, 274), memory (276, 278, 280, 282), and FPGAs (if present) (288, 290, 292, 294). Each of the control modules (264, 266) includes a switch fabric (284, 286) through which components within the control modules communicate.

In one embodiment of the invention, processors (268, 270, 272, 274) within a control module may directly communicate with each other using, for example, a point-to-point interconnect such as Intel® QuickPath Interconnect. Those skilled in the art will appreciate that other point-to-point communication mechanisms may be used to permit direct communication between the processors (268, 270, 272, 274) without departing from the invention. In addition, processors (268, 270) in control module A may communicate with components in control module B via a direct connection to the switch fabric (286) in control module B. Similarly, processors (272, 274) in control module B may communicate with components in control module A via a direct connection to the switch fabric (284) in control module A.

In one embodiment of the invention, each of the control modules is connected to various storage modules (denoted by storage module groups (304, 306, 308, 310)). As shown in FIG. 2D, each control module may communicate with storage modules connected to the switch fabric in the control module. Further, processors in control module A (264) may communicate with storage modules connected to control module B (266) using switch fabric B (286). Similarly, processors in control module B (266) may communicate with storage modules connected to control module A (264) using switch fabric A (284).

The interconnection between the control modules allows the storage control to distribute I/O load across the storage appliance regardless of which control module receives the I/O request. Further, the interconnection of control modules enables the storage appliance to process a larger number of I/O requests. Moreover, the interconnection of control modules provides built-in redundancy in the event that a control module (or one or more components therein) fails.

With respect to FIGS. 2B-2D, in one or more embodiments of the invention, the in-memory data structure is mirrored across the memories in the control modules. In such cases, the processors in the control modules issue the necessary commands to update all memories within the storage appliance such that the in-memory data structure is mirrored across all the memories. In this manner, any processor may use its own memory to determine the location of a data (as defined by an n-tuple, discussed above) in the storage appliance. This functionality allows any processor to service any I/O request in regards to the location of the data within the storage module. Further, by mirroring the in-memory data structures, the storage appliance may continue to operate when one of the memories fails.

Those skilled in the art will appreciate that while FIGS. 2A-2D show control modules connected to a limited number of storage modules, the control module may be connected to any number of storage modules without departing from the invention. Those skilled in the art will appreciate that while FIGS. 2A-2D show various configurations of the storage appliance, the storage appliance may be implemented using other configurations without departing from the invention.

FIG. 3 shows a storage module in accordance with one or more embodiments of the invention. The storage module (320) includes a storage module controller (322), memory (324), and one or more solid state memory modules (330A, 330N). Each of these components is described below.

In one embodiment of the invention, the storage module controller (322) is configured to receive requests to read from and/or write data to one or more control modules. Further, the storage module controller (322) is configured to service the read and write requests using the memory (324) and/or the solid state memory modules (330A, 330N). Though not shown in FIG. 3, the storage module controller (322) may include a DMA engine, where the DMA engine is configured to read data from the memory (324) or from one of the solid state memory modules (330A, 330N) and write a copy of the data to a physical address in client memory (114 in FIG. 1D). Further, the DMA engine may be configured to write data from the memory (324) to one or more of the solid state memory modules. In one embodiment of the invention, the DMA engine is configured to be programmed by the processor (e.g., 208 in FIG. 2A). Those skilled in the art will appreciate that the storage module may include a DMA engine that is external to the storage module controller without departing from the invention.

In one embodiment of the invention, the memory (324) corresponds to any volatile memory including, but not limited to, Dynamic Random-Access Memory (DRAM), Synchronous DRAM, SDR SDRAM, and DDR SDRAM.

In one embodiment of the invention, the memory (324) may be logically or physically partitioned into vaulted memory (326) and cache (328). In one embodiment of the invention, the storage module controller (322) is configured to write out the entire contents of the vaulted memory (326) to one or more of the solid state memory modules (330A, 330N) in the event of notification of a power failure (or another event in which the storage module may lose power) in the storage module. In one embodiment of the invention, the storage module controller (322) is configured to write the entire contents of the vaulted memory (326) to one or more of the solid state memory modules (330A, 330N) between the time of the notification of the power failure and the actual loss of power to the storage module. In contrast, the content of the cache (328) is lost in the event of a power failure (or another event in which the storage module may lose power).

In one embodiment of the invention, the solid state memory modules correspond to any data storage device that uses solid-state memory to store persistent data. In one embodiment of the invention, solid-state memory may include, but is not limited to, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM).

In one embodiment of the invention, the following storage locations are part of a unified address space: (i) the portion of the client memory accessible via the client switch, (ii) the memory in the control module, (iii) the memory in the storage modules, and (iv) the solid state memory modules. Accordingly, from the perspective of the processor in the storage appliance, the aforementioned storage locations (while physically separate) appear as a single pool of physical addresses. Said another way, the processor may issue read and/or write requests for data stored at any of the physical addresses in the unified address space. The aforementioned storage locations may be referred to as storage fabric that is accessible using the unified address space.

In one embodiment of the invention, a unified address space is created, in part, by the non-transparent bridge in the client switch which allows the processor in the control module to "see" a portion of the client memory. Accordingly, the processor in the control module may perform read and/or write requests in the portion of the client memory that it can "see".

Figure 4D:
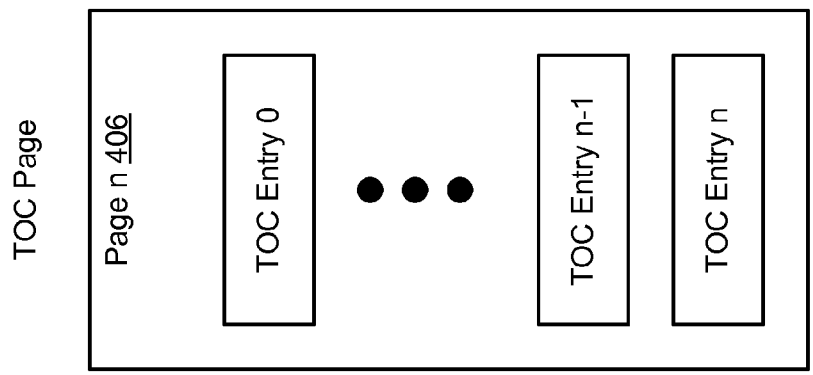
FIG. 4D shows a TOC page in accordance with one or more embodiments of the invention.
Figure 4C:
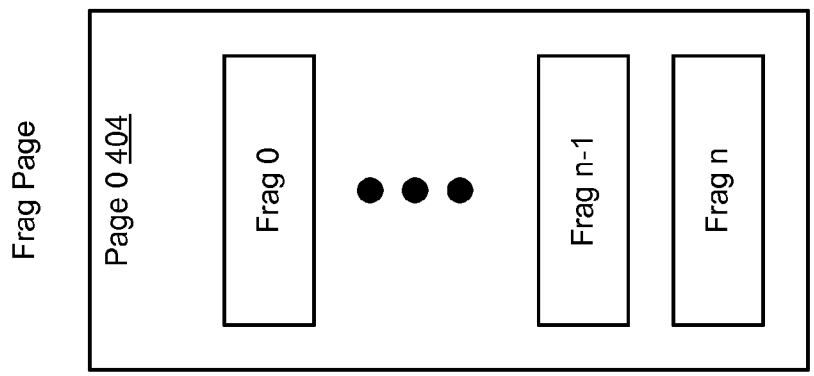
FIG. 4C shows a frag page in accordance with one or more embodiments of the invention.
Figure 4B:
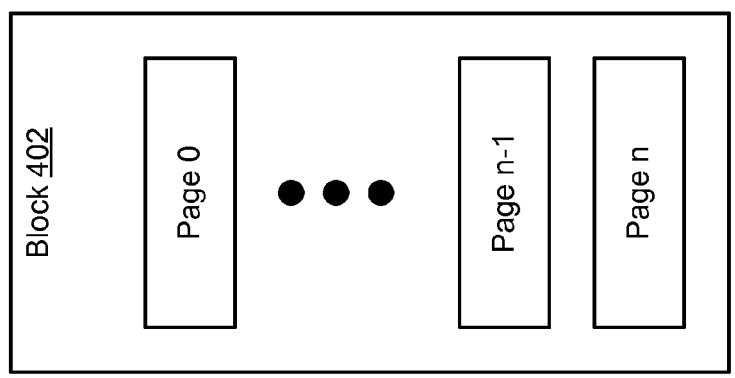
FIG. 4B shows a block in accordance with one or more embodiments of the invention.
Figure 4A:
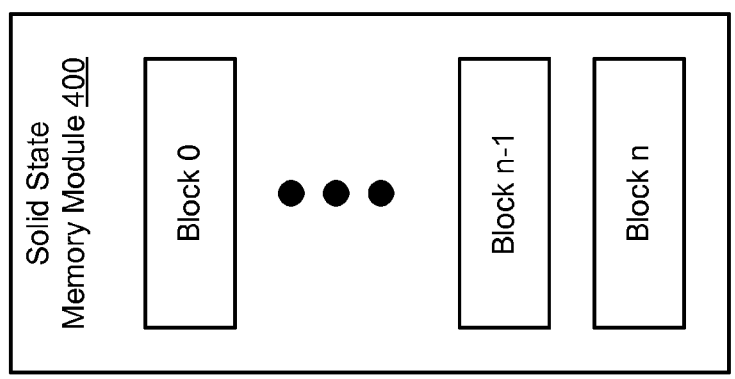
FIG. 4A shows a storage module in accordance with one or more embodiments of the invention.

FIG. 4A shows a storage module in accordance with one or more embodiments of the invention. The solid state memory module (400) includes one or more blocks. In one embodiment of the invention, a block is the smallest erasable unit of storage within the solid state memory module (400).

FIG. 4B shows a block in accordance with one or more embodiments of the invention. More specifically, each block (402) includes one or more pages. In one embodiment of the invention, a page is the smallest addressable unit for read and program operations (including the initial writing to a page) in the solid state memory module. In one embodiment of the invention, rewriting a page within a block requires the entire block to be rewritten. In one embodiment of the invention, each page within a block is either a Frag Page (see FIG. 4C) or a TOC Page (see FIG. 4D).

FIG. 4C shows a frag page in accordance with one or more embodiments of the invention. In one embodiment of the invention, the frag page includes one or more frags. In one embodiment of the invention, a frag corresponds to a finite amount of user data. Further, the frags within a given page may be of a uniform size or of a non-uniform size. Further, frags within a given block may be of a uniform size or of a non-uniform size. In one embodiment of the invention, a given frag may be less than the size of a page, may be exactly the size of a page, or may extend over one or more pages. In one embodiment of the invention, a frag page only includes frags. In one embodiment of the invention, each frag includes user data (i.e., data provided by the client for storage in the storage appliance). For purposes of this description, the term "frag" and "user data" are used interchangeably.

FIG. 4D shows a TOC page in accordance with one or more embodiments of the invention. In one embodiment of the invention, the TOC page (406) includes one or more TOC entries, where each of the TOC entries includes metadata for a given frag. In addition, the TOC page (406) may include a reference to another TOC page in the block (402). In one embodiment of the invention, a TOC page only includes TOC entries (and, optionally, a reference to another TOC page in the block), but does not include any frags. In one embodiment of the invention, each TOC entry corresponds to a frag (see FIG. 4C) in the block (402). The TOC entries only correspond to frags within the block. Said another way, the TOC page is associated with a block and only includes TOC entries for frags in that block. In one embodiment of the invention, the last page that is not defective in each block within each of the solid state memory modules is a TOC page.

Figure 4E:
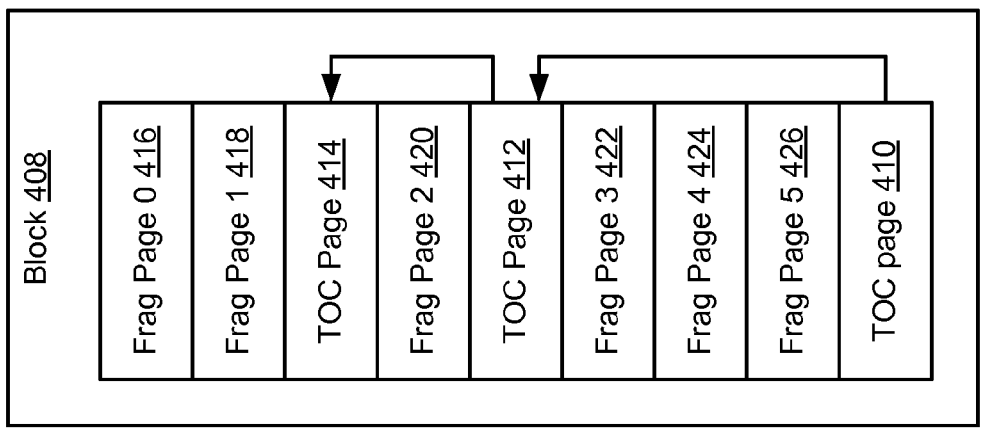
FIG. 4E shows a block in accordance with one or more embodiments of the invention.

FIG. 4E shows a block in accordance with one or more embodiments of the invention. More specifically, FIG. 4E shows a block (408) that includes TOC pages (410, 412, 414) and frag pages (416, 418, 420, 422, 424, 426). In one embodiment of the invention, the block (408) is conceptually filled from "top" to "bottom." Further, TOC pages are generated and stored once the accumulated size of the TOC entries for the frags in the frag pages equal the size of a page. Turning to FIG. 4E, for example, frag page 0 (416) and frag page 1 (418) are stored in the block (408). The corresponding TOC entries (not shown) for the frags (not shown) in frag page 0 (416) and frag page 1 (418) have a total cumulative size equal to the size of a page in the block. Accordingly, a TOC page (414) is generated (using the TOC entries corresponding to frags in the block) and stored in the block (408). Frag page 2 (420) is subsequently written to the block (408). Because the TOC entries corresponding to the frags (not shown) in frag page 2 (420) have a total cumulative size equal to the size of a page in the block, TOC page (412) is created and stored in the block (408). Further, because there is already a TOC page in the block (408), TOC page (412) also includes a reference to TOC page (414).

This process is repeated until there is only one page remaining in the block (408) to fill. At this point, a TOC page (410) is created and stored in the last page of the block (408). Those skilled in the art will appreciate that the total cumulative size of the TOC entries in the TOC page (410) may be less than the size of the page. In such cases, the TOC page may include padding to address the difference between the cumulative size of the TOC entries and the page size. Finally, because there are other TOC pages in the block (408), TOC page (410) includes a reference to one other TOC page (412).

As shown in FIG. 4E, the TOC pages are linked from the "bottom" of the block to "top" of the page, such that the TOC page may be obtained by following a reference from a TOC page that is below the TOC page. For example, TOC page (412) may be accessed using the reference in TOC page (410).

Those skilled in the art will appreciate that while block (408) only includes frag pages and TOC pages, block (408) may include pages (e.g., a page that includes parity data) other than frag pages and TOC pages without departing from the invention. Such other pages may be located within the block and, depending on the implementation, interleaved between the TOC pages and the frag pages.

FIG. 4F shows a TOC entry in accordance with one or more embodiments of the invention. In one embodiment of the invention, each TOC entry (430) includes metadata for a frag (and in particular the user data in the frag) and may include one or more of the following fields: (i) object ID (432), which identifies the object (e.g., file) being stored; (ii) the birth time (434), which specifies the time (e.g., the processor clock value of the processor in the control module) at which the frag corresponding to the TOC entry was written to the vaulted memory; (iii) offset ID (436), which identifies the starting point of the user data in the frag relative to the beginning of the object (identified by the object ID); (iv) fragment size (438), which specifies the size of the frag; (v) page ID (440), which identifies the page in the block in which the frag is stored; (vi) byte (442), which identifies the starting location of the frag in the page (identified by the page ID); (vii) logical length (444), which specifies the non-compressed length of the user data in the frag; (viii) type (446), which specifies the type of user data in the frag (e.g., badpage, data, snapshot, pool); (ix) kind (448), which specifies whether the frag is valid user data or trim (which indicates that the frag may be erased when the solid state memory module performs garbage collection); and (ix) reserved (450), which corresponds to space in the TOC entry that may be used to store other user data.

In one embodiment of the invention, the <object ID, offset ID> or <object ID, offset ID, birth time> identify user data that is provided by the client. Further, the <object ID, offset ID> or <object ID, offset ID, birth time> are used by the client to identify particular user data, while the storage appliance uses a physical address(es) to identify user data within the storage appliance. Those skilled in the art will appreciate that the client may provide a logical address instead of the object ID and offset ID.

Those skilled in the art will appreciate that the TOC entry may include additional or fewer fields than shown in FIG. 4F without departing from the invention. Further, the fields in the TOC entry may be arranged in a different order and/or combined without departing from the invention. In addition, while the fields in the TOC entry shown in FIG. 4F appear to all be of the same size, the size of various fields in the TOC entry may be non-uniform, with the size of any given field varying based on the implementation of the TOC entry.

Figure 5:
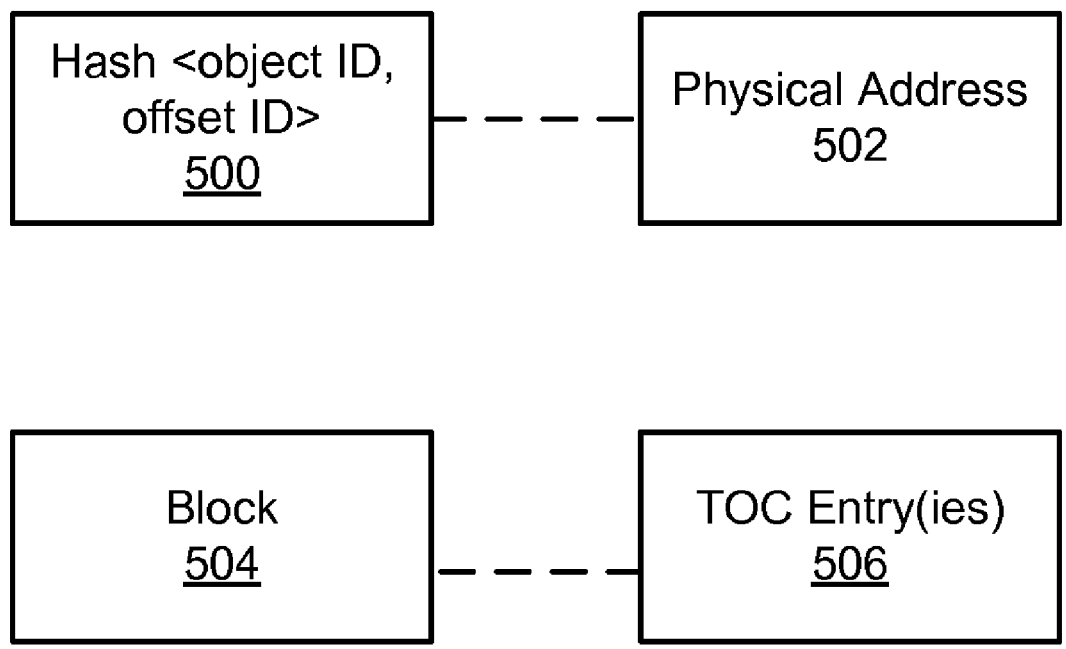
FIG. 5 shows data structures in accordance with one or more embodiments of the invention.

FIG. 5 shows data structures in accordance with one or more embodiments of the invention. As discussed above, the memory in the control module includes an in-memory data structure. In one embodiment of the invention, the in-memory data structure includes a mapping between an n-tuple (e.g., <object ID, offset ID> (500), <object ID, offset ID, birth time> (not shown)) and a physical address (502) of the frag in a solid state memory module. In one embodiment of the invention, the mapping is between a hash of the n-tuple and the physical address. In one embodiment of the invention, the physical address for a frag is defined as the following n-tuple: <storage module, channel, chip enable, LUN, plane, block, page, byte>.

In one embodiment of the invention, the control module also tracks the number of TOC entries (506) per block (504). More specifically, each time a frag is written to vaulted memory, a TOC entry for the frag is created. The control module tracks with which block the newly created TOC entry is associated and uses this information to generate TOC pages. For example, the control module uses the aforementioned information to determine whether the cumulative size of all TOC entries associated with a given block, which have not been written to a TOC page, equal a page size in the block. If the cumulative size of all TOC entries associated with a given block, which have not been written to a TOC page, equal a page size in the block, then the control module may generate a TOC page using the aforementioned entries and initiate the writing of the TOC page to a storage module.

Figure 6A:
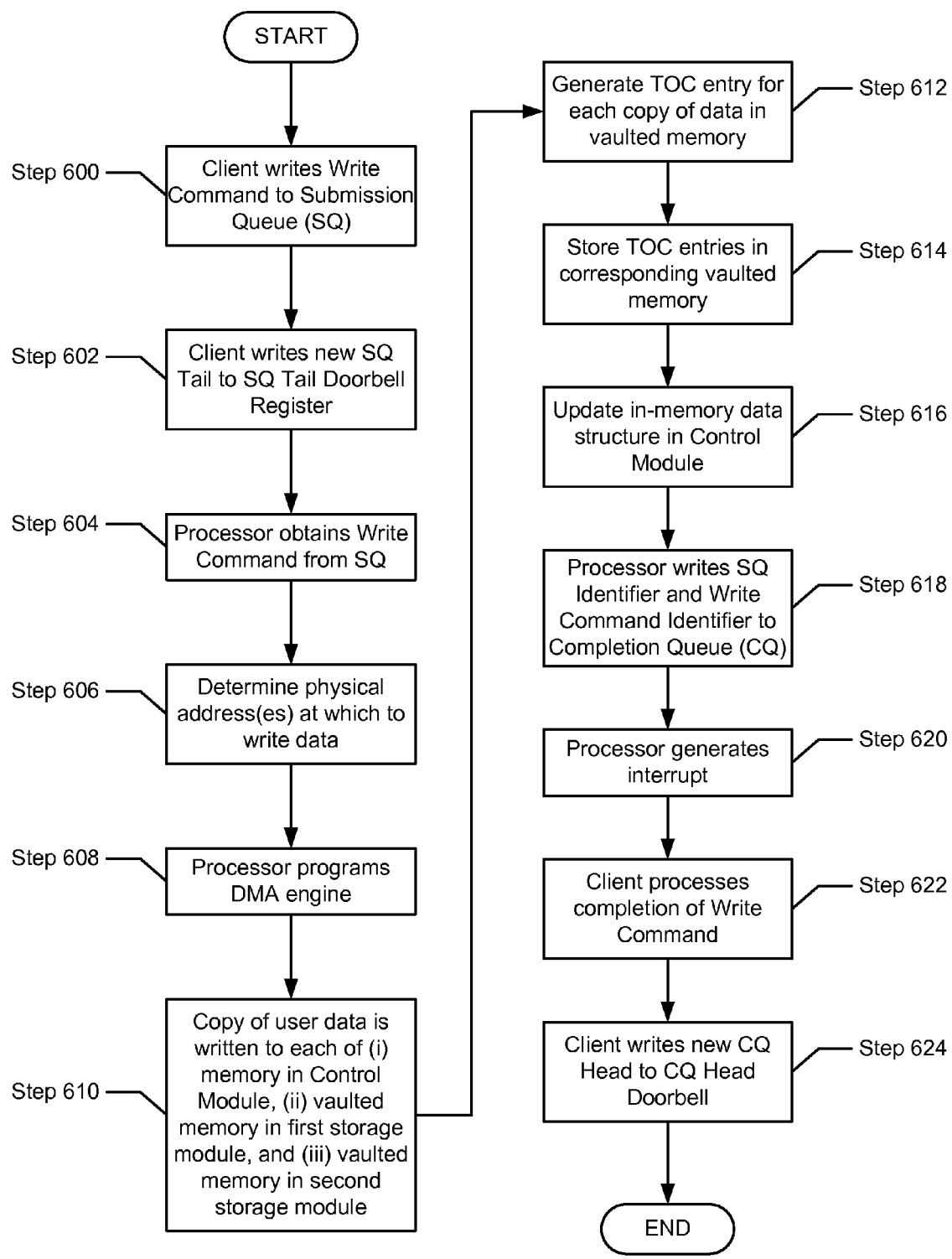
FIGS. 6A-6C show flowcharts in accordance with one or more embodiments of the invention.
Figure 6B:
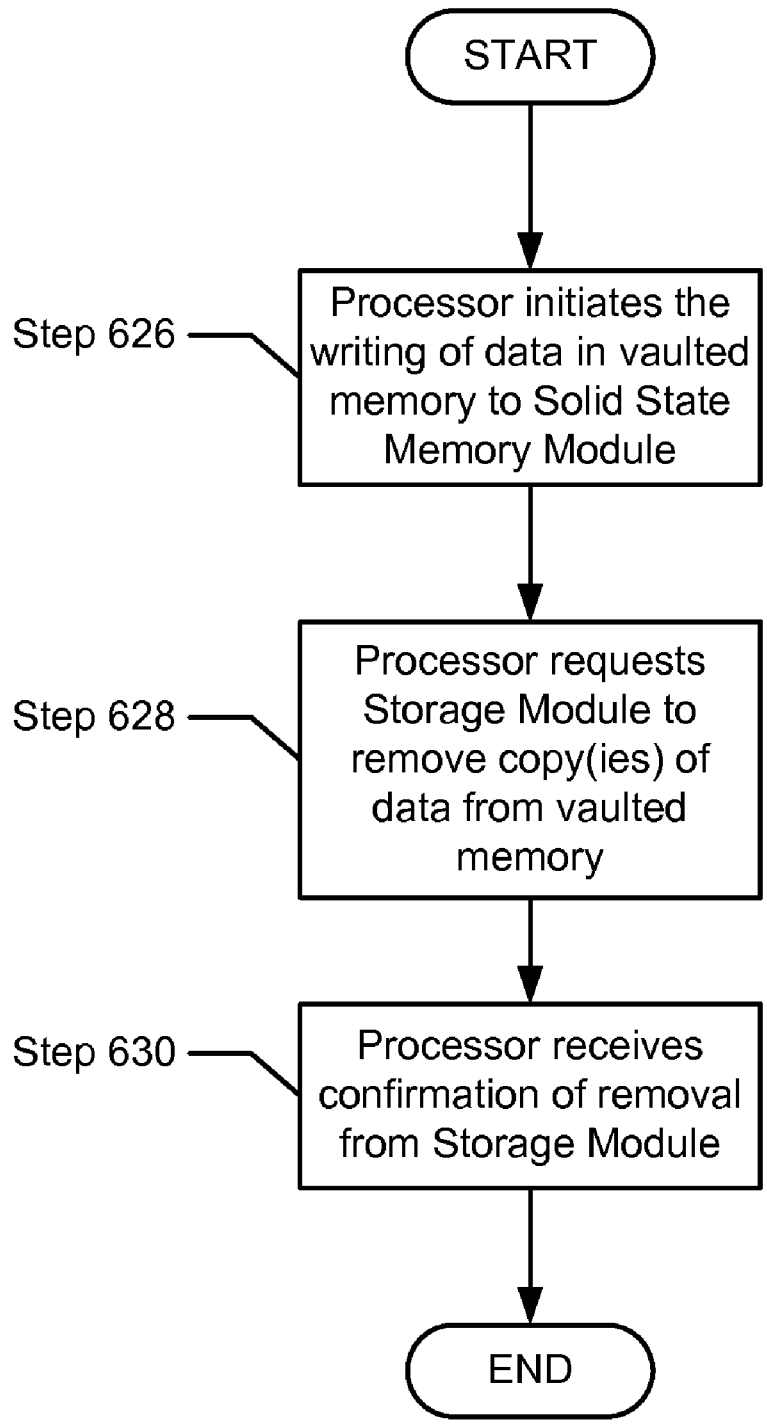
Figure 6C:
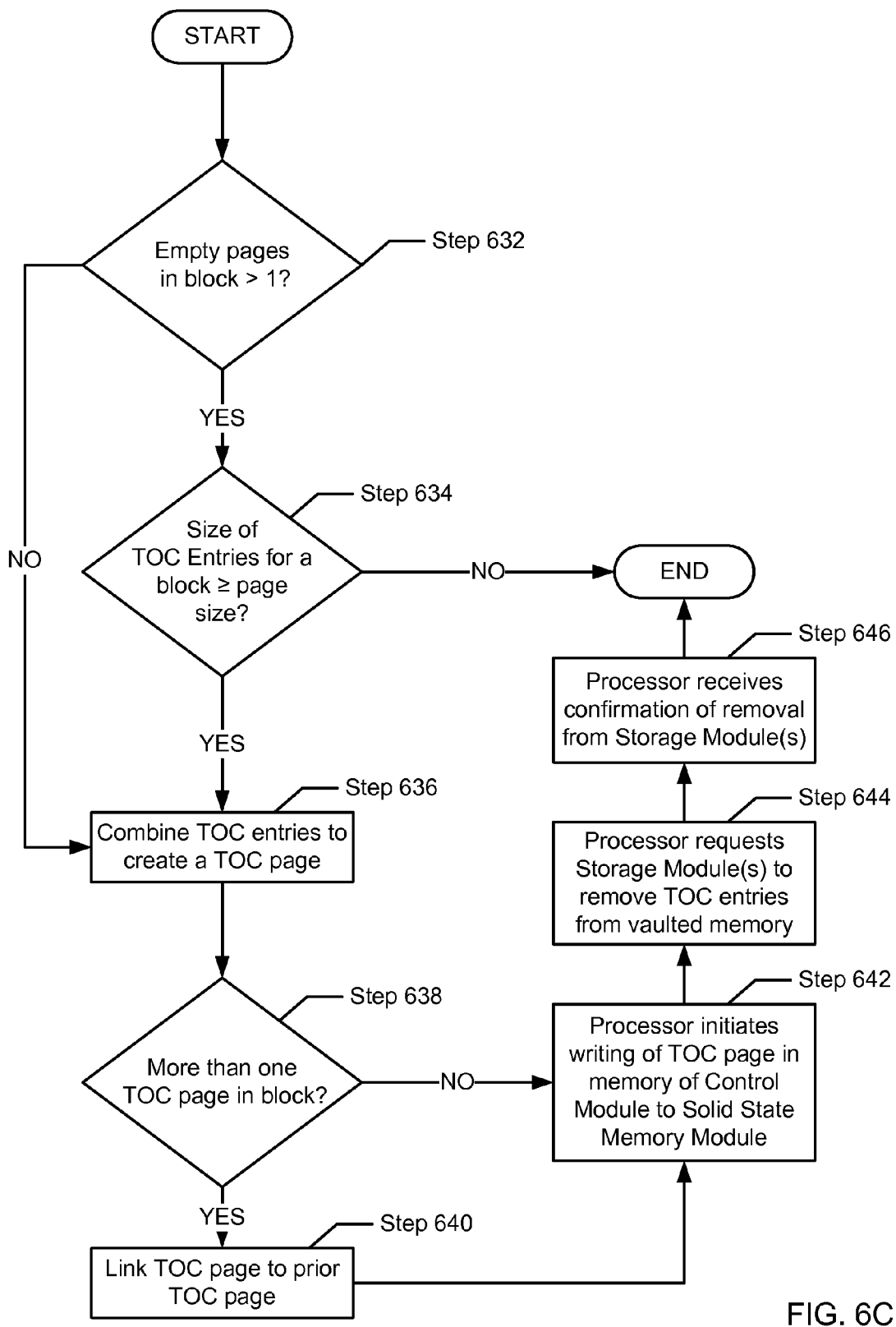

FIGS. 6A-6C show flowcharts in accordance with one or more embodiments of the invention. More specifically, FIGS. 6A-6C show a method for storing user data in a storage appliance in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIG. 6A may be performed in parallel with the steps shown in FIG. 6B and the steps shown in FIG. 6C. Further, the steps shown in FIG. 6B may be performed in parallel with the steps shown in FIG. 6C.

Referring to FIG. 6A, in step 600, the client writes a write command (write request) to the submission queue (SQ) of the processor in a control module (208 in FIG. 2A). In one embodiment of the invention, the write command specifies the logical address (which may also be referred to as a "source address") of the user data in the client memory. In one embodiment of the invention, the write command may specify the user data using <object ID, offset ID>. In one embodiment of the invention, the write command passes through at least the client switch and the switch fabric prior to reaching the SQ of the processor.

In step 602, client writes a new SQ tail to the SQ Tail doorbell register. In one embodiment of the invention, by writing to the SQ Tail doorbell register, the client notifies the processor that there is a new command to process in its SQ.

In step 604, the processor obtains the write command from the SQ. In step 606, the processor determines the physical address(es) at which to write the user data (as part of a frag). In one embodiment of the invention, the physical address(es) corresponds to a location in the solid state memory module. In one embodiment of the invention, the processor selects two physical addresses in which to write copies of the user data, where each of the physical addresses is in a separate solid state memory module.

In step 608, the processor programs the DMA engine to issue a write to a multicast address. In one embodiment of the invention, the multicast address is associated with a multicast group, where the multicast group specifies a first memory location in the memory in the control module, a second memory location in a first vault memory, and a third memory location in a second vaulted memory. In one embodiment of the invention, the first vaulted memory is located in the same storage module as the solid state memory module that includes the physical address specified by the processor. In one embodiment of the invention, the second vaulted memory is determined in a similar manner. In one embodiment of the invention, there is one vaulted memory location selected for each physical address identified by the processor in step 606.

In step 610, the DMA engine reads the user data from the source address in client memory, and writes the data to the multicast address as directed by the control module. In one embodiment of the invention, a switch in the switch fabric is associated with the multicast address. Upon receipt of the address, the switch performs the necessary translation on the multicast address to obtain three addresses—one to each of the aforementioned memory locations. The switch subsequently sends copies of the user data to the three memory locations. Those skilled in the art will appreciate that the particular switch which implements multicast may vary based on the implementation of the switch fabric. In this embodiment, there is only one write issued between the client and the storage appliance.

In another embodiment of the invention, in Step 608, the processor programs the DMA engine to issue three write requests in parallel—one to each of the aforementioned memory locations. In this embodiment, in Step 610, DMA engine issues the three write requests in parallel. In this embodiment, there are three writes issues between the client and the storage appliance.

Continuing with FIG. 6A, in step 612, a TOC entry is created for each copy of user data stored in vaulted memory. Further, the page and byte specified in each TOC entry corresponds to the page and byte portions of the corresponding physical address identified in step 606. Accordingly, while the frag is not written to the physical address in the solid state memory module at the time the corresponding TOC entry is created, the frag (as part of a frag page) is intended to be written to the physical address at a later point in time. As discussed above, each of the TOC entries is stored in a TOC page and the TOC page is eventually written to a solid state memory module. However, prior to the creation of the TOC page, the TOC entries are created and temporarily stored in the memory in the control module and in vaulted memory on one of the solid state storage modules.

Continuing with FIG. 6A, in step 614, the TOC entries created in step 612 are stored in vaulted memory. More specifically, each TOC entry is stored in the vaulted memory of the storage module and includes the physical address at which the corresponding frag will be written at a later point in time.

In step 616, the processor updates the in-memory data structure to reflect that three copies of the user data are stored in the storage appliance. The processor may also update the data structure that tracks the TOC entries per block (see FIG. 5). In step 618, the processor writes the SQ Identifier (which identifies the SQ of the processor) and a Write Command Identifier (which identifies the particular write command the client issued to the processor) to the completion queue (CQ) of the client.

In step 620, the processor generates an interrupt for the client processor. In one embodiment of the invention, the processor uses the doorbell interrupts provided by the non-transparent bridge to issue an interrupt to the client processor. In step 622, the client processes the data in its CQ. At this stage, the client has been notified that the write request has been serviced. In step 624, once the client has processed the data at the head of the completion queue, the client writes a new CQ head to the CQ head doorbell. This signifies to the processor the next location in the CQ to use in future notifications to the client.

Referring to FIG. 6B, in step 626, the processor in the control module initiates the writing of the copies of the user data from the vaulted memory to the physical address identified in step 608. In one embodiment of the invention, the processor in the control module programs a DMA engine in the storage module controller to read user data from the vaulted memory and to write a copy of this user data to a physical address in the solid state memory module. As described above, the physical address to which the copy of user data is written is the physical address previously determined by the processor in Step 606.

In step 628, following step 626, the processor in the control module requests that all copies of the user data in vaulted memory that correspond to the user data written to the solid state memory module in step 626 are removed. In step 630, a confirmation of the removal is sent to the processor in the control module by each of the storage modules that included a copy of the user data (written in step 626) in their respective vaulted memory.

Referring to FIG. 6C, FIG. 6C shows a method that is performed each time a TOC entry is created. In step 632, a determination is made about whether there is more than one empty page remaining in the block. Said another way, a determination is made about whether user data has been written to all other pages except the last page in the block. If there is more than one empty page remaining in the block, the process proceeds to Step 636; otherwise the process proceeds to step 634. As discussed above, if there is only one empty page in the block in which to write user data, then a TOC page must be written to the last page in the block.

In step 634, a determination is made about whether the cumulative size of TOC entries associated with the block (which have not been written to a TOC page in the block) are greater than or equal to a page size. If the cumulative size of TOC entries associated with the block (which have not been written to a TOC page in the block) are greater than or equal to a page size, then the process proceeds to Step 636; otherwise the process ends.

In step 636, the TOC entries for the block (which have not been written to a TOC page in the block) are combined to create a TOC page. In one embodiment of the invention, if there is only one empty page in the block in which to write user data, then the TOC page created in this scenario may including padding (as discussed above). In step 638, a determination is made about whether the block includes another TOC page. If the block includes another TOC page, the process proceeds to step 640; otherwise the process proceeds to step 642. In step 640, a reference to the most recently stored TOC page in the block is included in the TOC page created in step 636 (e.g., TOC page (410) references TOC page (412) in FIG. 4E).

In step 642, the processor initiates the writing of the TOC page to a solid state memory module. More specifically, a DMA engine programmed by the processor writes a copy of the TOC page to the block in the solid state memory module that includes the frags corresponding to the TOC entries in the TOC page.

In step 644, the processor requests all storage modules that include TOC entries that were included in the TOC page written to the solid state memory module in Step 642 to remove such TOC entries from their respective vaulted memories. In step 646, the processor receives confirmation, from the storage modules, that the aforementioned TOC entries have been removed.

FIGS. 7A-7E show an example of storing user data in a storage appliance in accordance with one or more embodiments of the invention. The example is not intended to limit the scope of the invention.

Figure 7A:
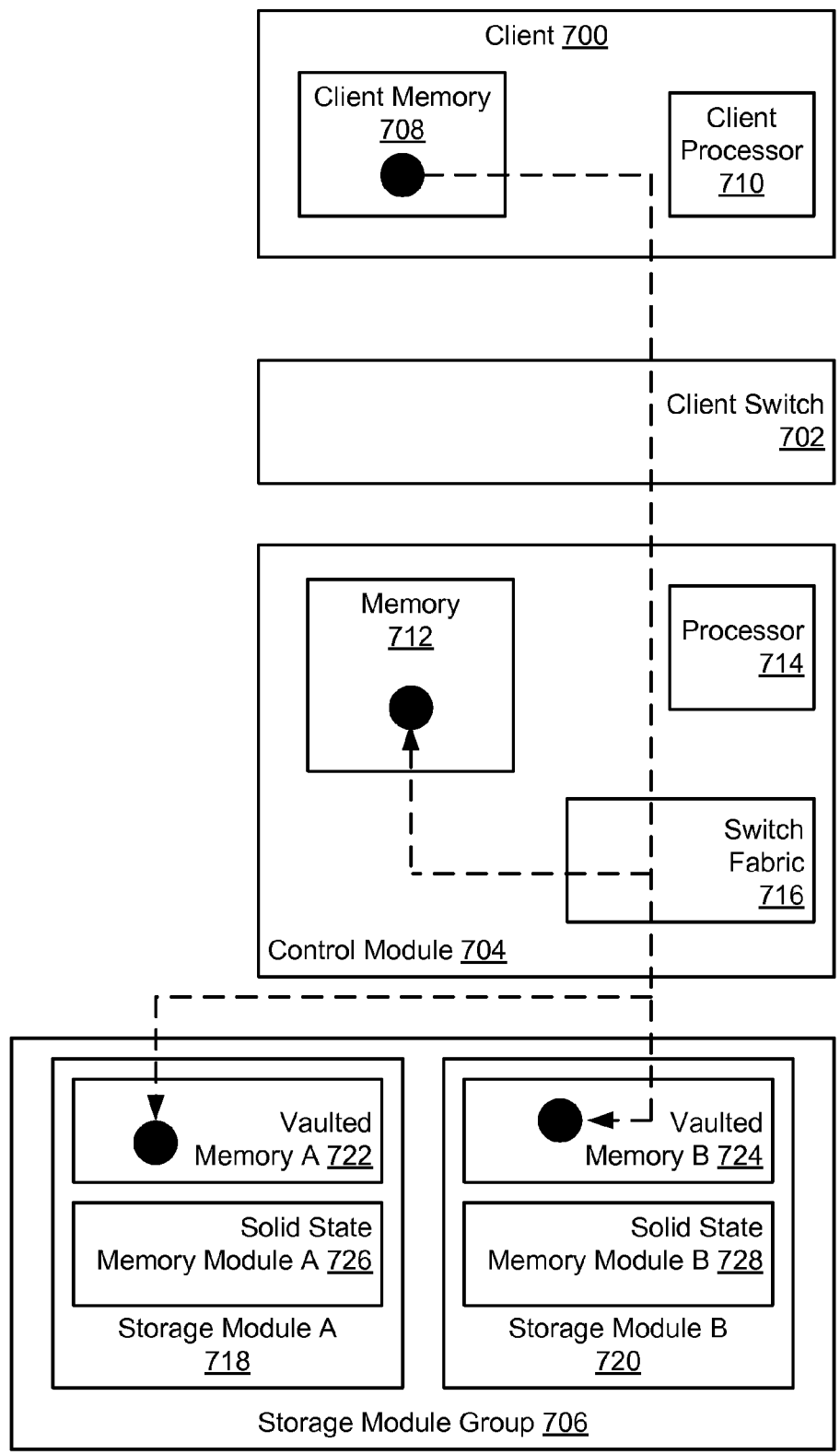
FIGS. 7A-7E show examples in accordance with one or more embodiments of the invention.

Turning to FIG. 7A, consider the scenario in which the client (700) issues a request to write user data (denoted by the black circle) to the storage appliance. In response to the request, the processor (714) in the control module (704) determines that a first copy of the user data should be written to a first physical location in solid state memory module A (726) in storage module A (718) and that a second copy of the user data should be written to a second physical location in solid state memory module B (728) in storage module B (720).

The processor (714) prior to receiving the write request creates a multicast group with three members. A first member has a destination address in vaulted memory A (722), the second member has a destination address in vaulted memory B (724), and the third member has a destination address in memory (712). The processor (714) subsequently programs a switch (not shown) in the switch fabric (716) to implement the multicast group.

The DMA engine proceeds issue a write to a multicast address associated with the multicast group. The write is transmitted to the switch fabric and ultimately reaches the switch (not shown) that implements the multicast group. The switch subsequently creates three writes (each to one destinations specified by the multicast group) and issues the writes to the target memory locations. In one embodiment of the invention, the three writes occur in parallel The frags to be written at the various destination addresses pass through the switch fabric (716). Once the writes are complete, there are three copies of the user data in the storage appliance. Once the writes are complete, the in-memory data structure (not shown) in the memory (712) is updated to reflect that the user data is stored in three locations within the storage appliance. Further, the client (700) is notified that the write is complete.

Figure 7B:
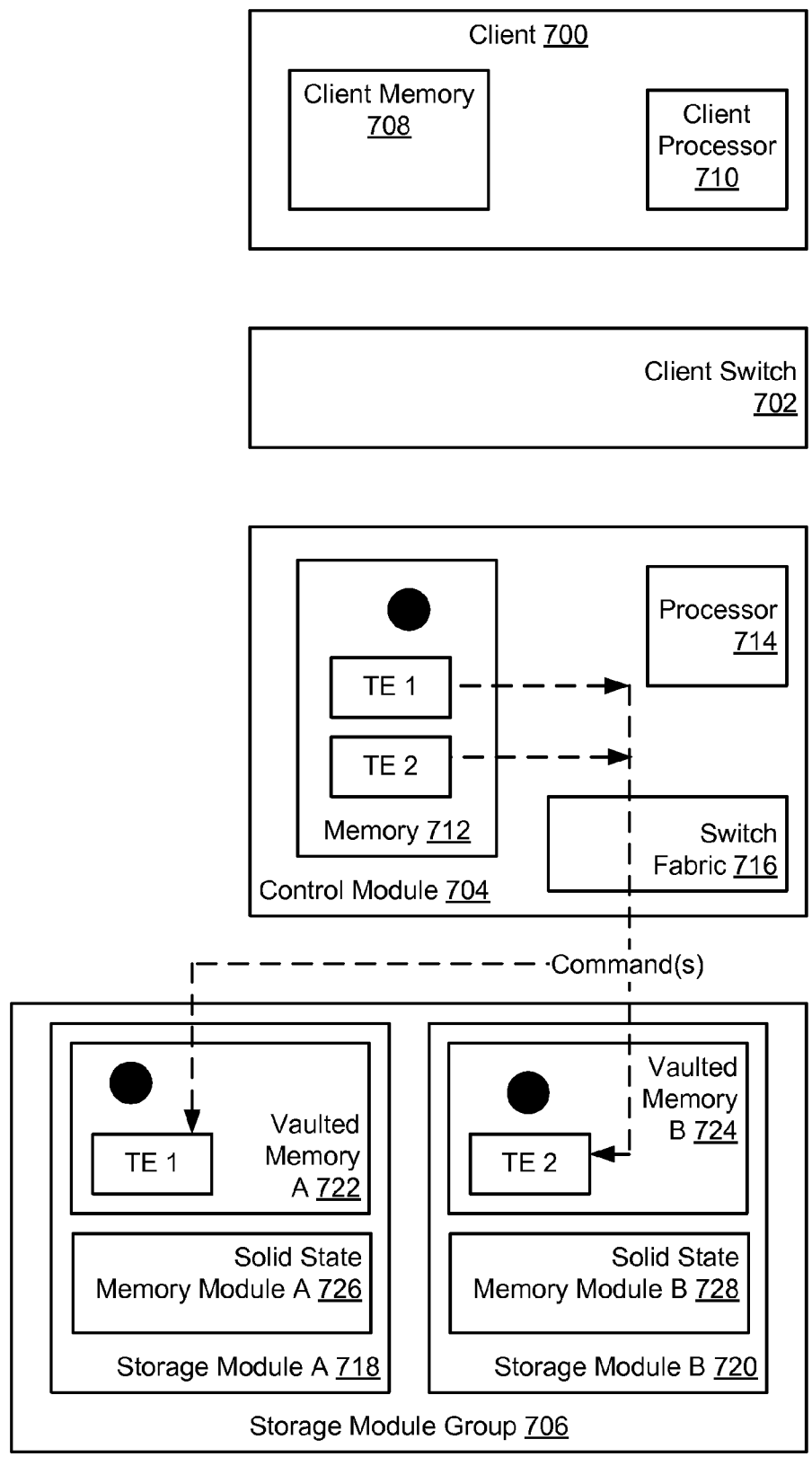

Referring to FIG. 7B, once the frags are written to the vaulted memories, the processor generates a TOC entry (TE 1, TE 2) in memory (712) for each of the frags stored in vaulted memory. TE 1 is the TOC entry from the frag stored in vaulted memory A (722) and TE 2 is the TOC entry for the frag stored in vaulted memory B (724). The processor (via a DMA engine, not shown) subsequently writes a copy of TE 1 to vaulted memory A (722) and a copy of TE 2 to vaulted memory B (724). As discussed above, at this stage, the TOC entries (TE 1, and TE 2) are temporarily stored in the aforementioned vaulted memories until they are added to a TOC page and written to the appropriate solid state memory module.

Further, independent of the operation of the storage appliance, the client (700) may remove the user data (which has already been written to the storage appliance) from the client memory (708).

Figure 7C:
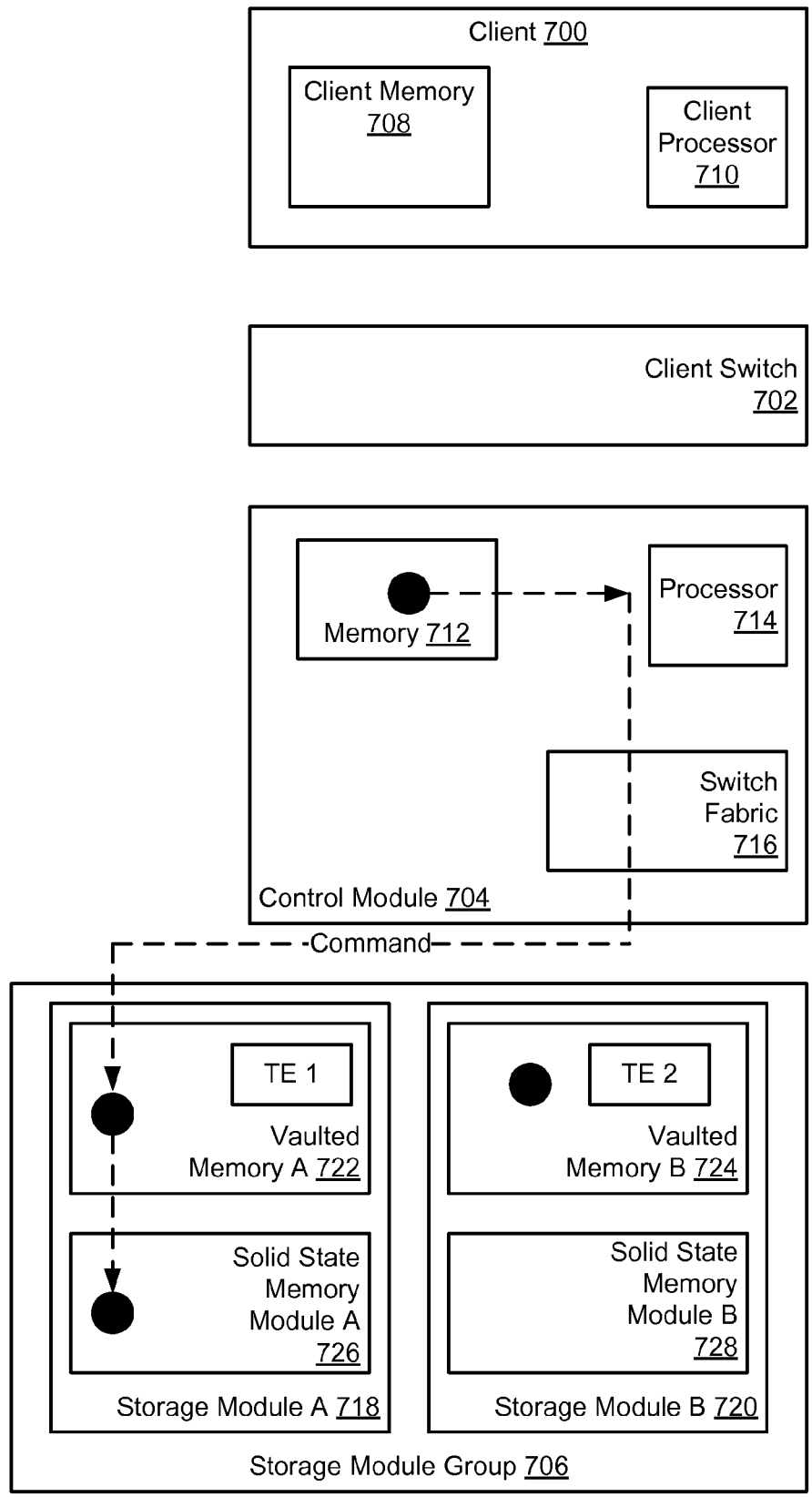

Referring to FIG. 7C, at some later point in time, the processor (714) issues a request to the storage module A (718) to write a copy of the user data currently in vaulted memory A (722) to the physical address in solid state memory module A (726). In response to the request, the storage module controller (not shown) writes a copy of the user data in vaulted memory A (722) to solid state memory module A (726). The processor (714) is notified once the write is complete. The processor (714) may update the in-memory data structure upon receipt of the notification from storage module A (718).

Figure 7D:
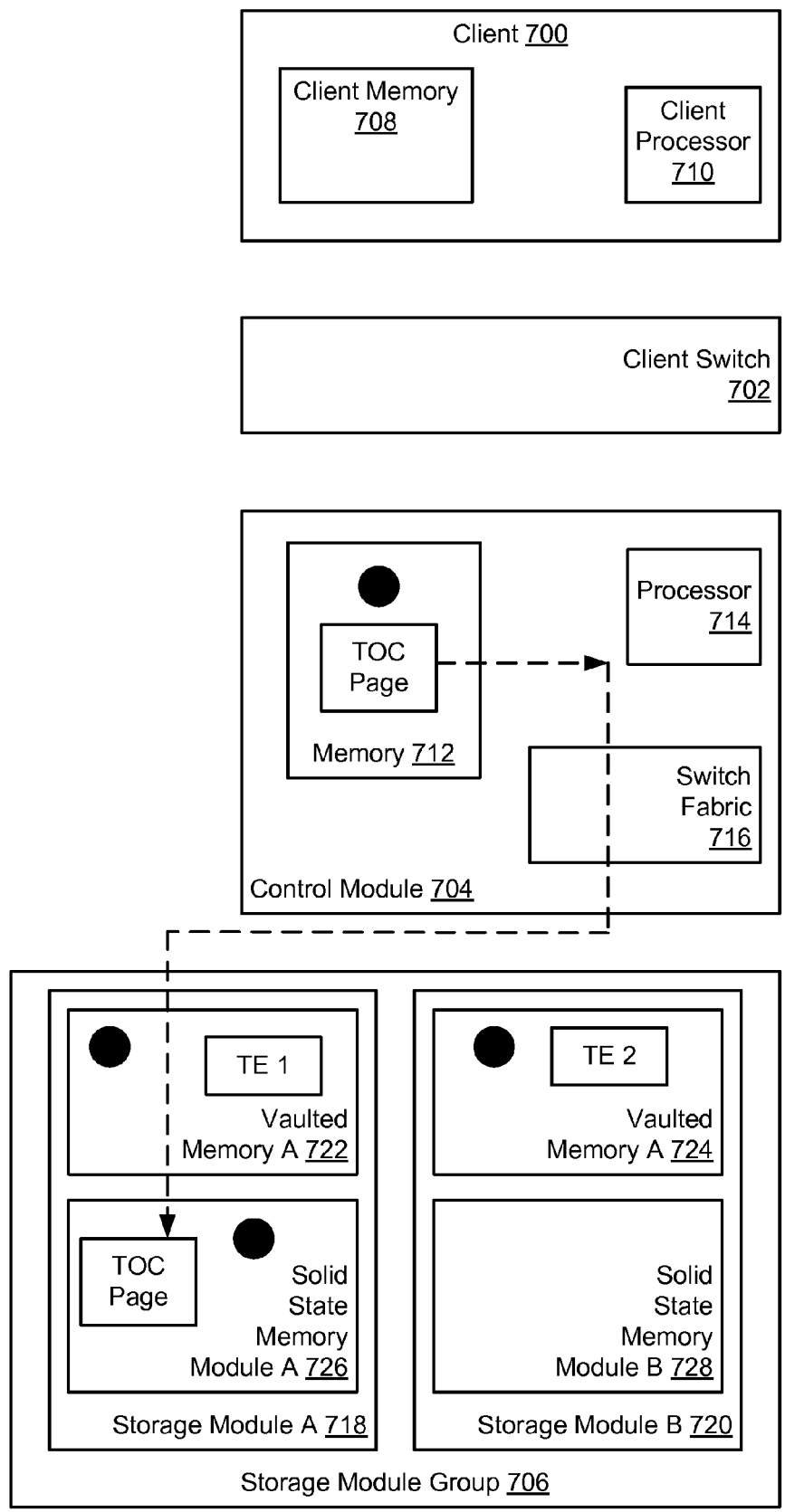

Referring to FIG. 7D, at some later point in time, the processor (714) determines that the cumulative total size of TE 1 and other TOC entries (not shown) for frags in the same block (i.e., the block in which the frag corresponding to TE 1 is stored) equals a page size. Based on this determination, the processor creates a TOC page and subsequently (via a DMA engine (not shown)) writes the TOC page to the block (not shown) in the solid state memory module that includes the frag to which TE 1 corresponds.

Figure 7E:
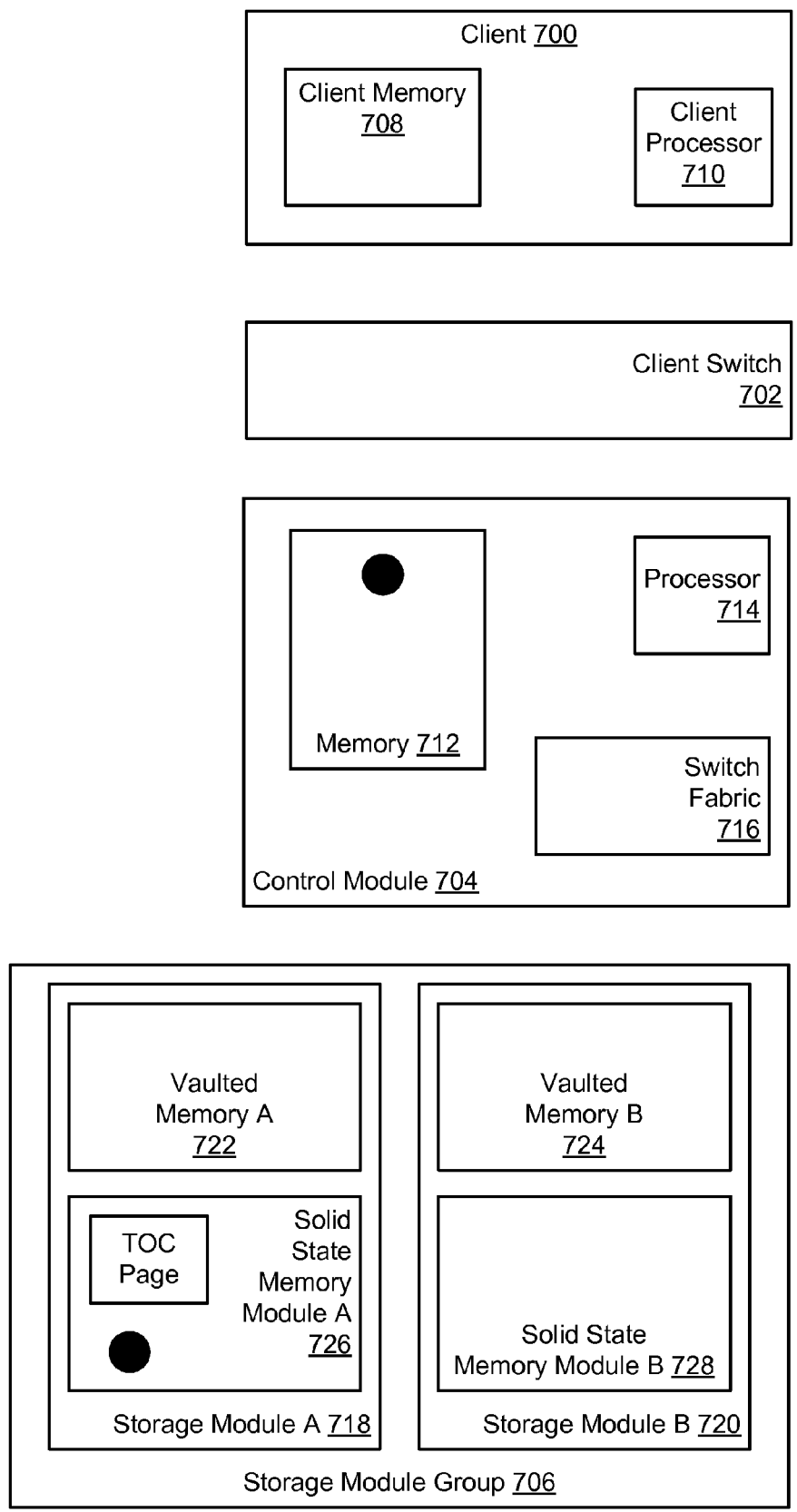

Referring to FIG. 7E, at some later point in time, once the frag has been written to solid state memory module A, the processor (714) issues a request to all storage modules that includes a copy of the user data in vaulted memory to remove the copy of the user data from their respective vaulted memories. In addition, once the TOC page has been written to solid state memory module A, the processor (714) issues a request to all storage modules that include a copy of any TOC entry written in the aforementioned TOC page to remove such TOC entries from their respective vaulted memories. The storage modules each notify the control module upon completion of these requests. FIG. 7E shows the state of the system after all storage modules have completed the above requests. The processor (714) may update the in-memory data structure upon receipt of the notification from storage modules that all copies of the user data in vaulted memory have been removed.

In one or more embodiments of the invention, a TOC entry is created for each copy of user data and stored in vaulted memory such that each copy of user data can be accessed in the event that one of the TOC entries is corrupted, lost, or otherwise unavailable. Further, in the event of a power failure, all TOC entries within the vaulted memory are written to the corresponding solid state memory module. Further, the frags corresponding to the aforementioned TOC entries are written to the physical addresses that the processor originally determined at the time the write request for the client was processed.

Figure 8:
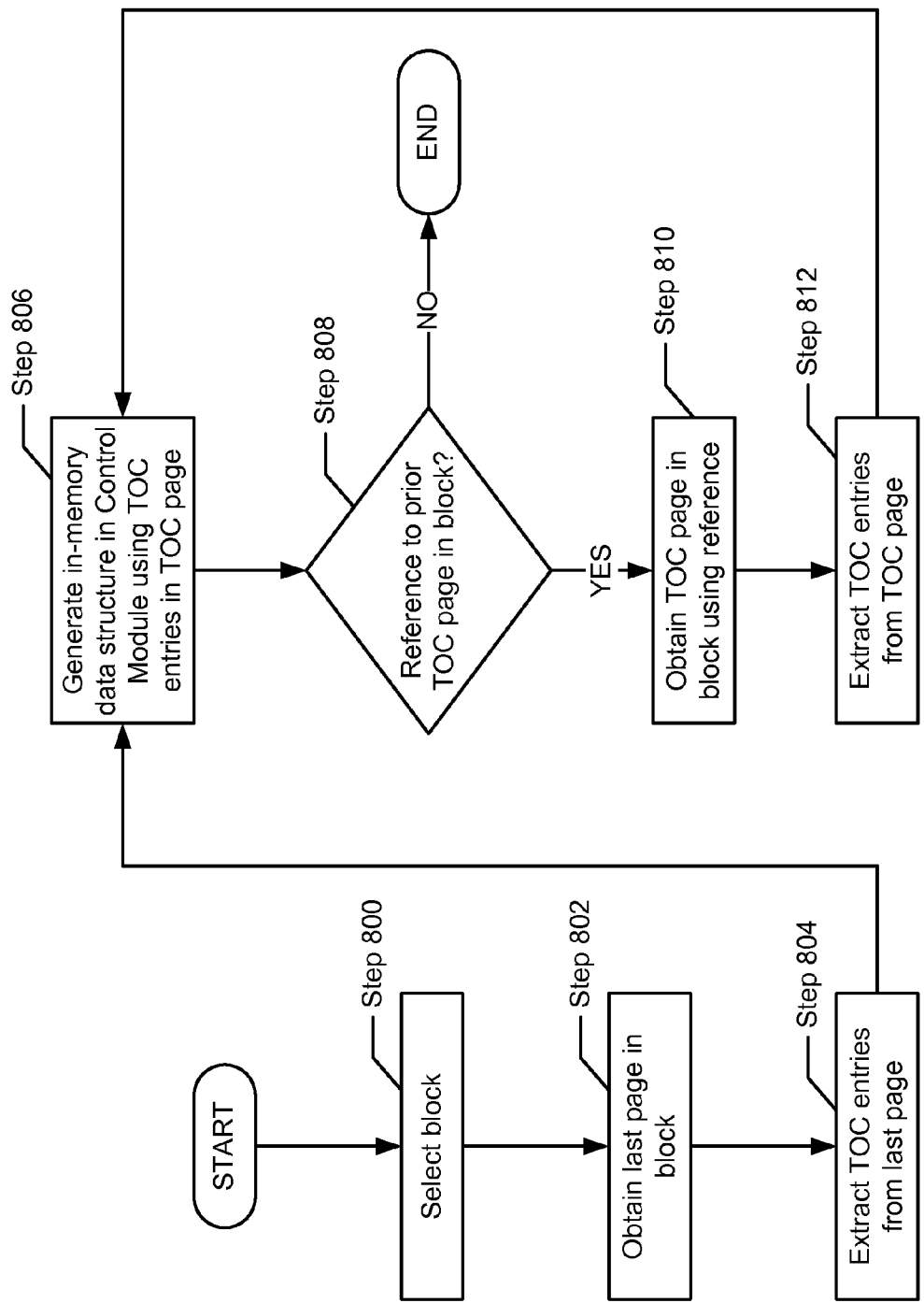
FIG. 8 shows a flowchart in accordance with one or more embodiments of the invention.

FIG. 8 shows a flowchart in accordance with one or more embodiments of the invention. More specifically, FIG. 8 shows a method for generating an in-memory data structure in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In step 800, a block is selected. In step 802, the last page in the block is obtained. For example, the processor reads the contents of the last page. As discussed above, the last page of every block in the solid state memory modules within the storage appliance is a TOC page. In step 804, the TOC entries are extracted from the TOC page.

In step 806, each of the TOC entries obtained in Step 804 are processed to populate the in-memory data structure. More specifically, processing each TOC entry may include one or more following: (i) extracting the page ID and byte information from the TOC entry; (ii) combining the information in (i) with <storage module, channel, chip enable, LUN, plane, block> to obtain a physical address; (iii) extracting the object ID and offset ID (and optionally the birth time) from the TOC entry; (iv) applying a hash function to <object ID, offset ID> (or, optionally, <object ID, offset ID, birthtime>) to generate a hash value; and (v) populating the in-memory data structure with a mapping of the hash value and the physical address.

In one embodiment of the invention, the processor already includes information about the <storage module, channel, chip enable, LUN, plane, block> because the processor needed this information to obtain the last page of the block. In one embodiment of the invention, the processor may (i) use the Type field in the TOC entry to determine whether the frag is in a bad page. If the frag is stored in a bad page, the processor may not generate a mapping in the in-memory data structure for the TOC entry.

In step 808, once all TOC entries in the TOC page have been processed, a determination is made about whether the TOC page includes a reference to another TOC page in the block (i.e., the block selected in Step 800). If the TOC page includes a reference to another TOC page in the block, the process proceeds to Step 810; otherwise the process ends. In step 810, the referenced TOC page is obtained. In step 812, the TOC entries are extracted from the TOC page. The process then proceeds to Step 806.

In one embodiment of the invention, the method in FIG. 8 may be performed in parallel for all blocks (or a subset of blocks) within the storage appliance when the system is powered on. Following this process, the resulting in-memory data structure may be updated by the processor as new user data is written to the storage appliance.

Those skilled in the art will appreciate that while the invention has been described with respect to the last page in each block being reserved as a TOC page, embodiments of the invention may be implemented by setting another page in the block as a reserved TOC page without departing from the invention.

In one embodiment of the invention, the in-memory data structure is generated prior to any operations (e.g., read operation, a write operation, and/or an erase operation) being performed on any datum stored in the solid state memory modules.

One or more embodiments of the invention provide a system and method in which all user data stored in the storage appliance is co-located with its metadata. In this manner, all user data stored in the storage appliance is self describing. By arranging the user data and corresponding metadata according to the various embodiments of the invention, the storage appliance is better protected against failure of a given solid state memory module (or a subset thereof). Said another way, if a given solid state memory module (or subset thereof) fails, the user data in other solid state memory modules in the system is still accessible because the metadata required to access the user data in the other solid state memory module is itself located in the other solid state memory modules.

Further, embodiments of the invention enable the creation of an in-memory data structure, which allows the control module to access user data in a single look-up step. Said another way, the control module may use the in-memory data structure to directly ascertain the physical address(es) of the user data in the storage appliance. Using this information, the control module is able to directly access the user data and does not need to traverse any intermediate metadata hierarchy in order to obtain the user data.

One or more embodiments of the invention may be implemented using instructions executed by one or more processors in the system. Further, such instructions may corresponds to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing data, comprising:
receiving a request to write a first datum to persistent storage, wherein the first datum is defined using a first logical address;
determining a first physical address in the persistent storage, wherein the first physical address comprises a first block ID and first sub block ID;
writing the first datum to a first location in the persistent storage identified by the first physical address;
generating a first table of contents entry (TE) comprising the first logical address, and the first sub block ID, wherein the first TE is not stored in a sub block identified by the first sub block ID and wherein the first logical address and the first sub block ID are not stored in the sub block identified by the first sub block ID; and
writing the first TE to a second physical address in the persistent storage, wherein the second physical address comprises the first block ID and a second sub block ID, wherein a second sub block corresponds to the second sub block ID, and wherein the second sub block is located within a first block corresponding to the first block ID and wherein a sub block identified by the second sub block ID does not include the first datum.

2. The method of claim 1, further comprising:
receiving a request to write a second datum to the persistent storage, wherein the second datum is defined using a second logical address;
determining a third physical address in the persistent storage, wherein the third physical address comprises the first block ID and third sub block ID;
writing the second datum to the third physical address;
generating a second TE comprising the second logical address and the third sub block ID, wherein the second TE is not stored in a sub block identified by the third sub block ID;
writing the second TE to a fourth physical address in the persistent storage, wherein the fourth physical address comprises the first block ID and a fourth sub block ID, wherein a fourth sub block corresponds to the fourth sub block ID, and wherein the fourth sub block is located within the first block, and wherein a sub block identified by the fourth sub block ID does not include the first datum.

3. The method of claim 1, wherein the persistent storage is solid state memory, and wherein the first block is a NAND block, and the first sub block is a NAND page.

4. The method of claim 1, wherein the fourth sub block comprises a reference to the second sub block.

5. A method for storing data, comprising:
receiving a request to write a first datum to persistent storage, wherein the first datum is defined using a first logical address;
determining a first physical address in persistent storage, wherein the first physical address comprises a first block ID and a first page ID;
writing a first frag comprising a copy of the first datum to a first location in the persistent storage identified by the first physical address;
generating a first table of contents entry (TE) comprising the first logical address and the first page ID, wherein the first TE is not stored in a page identified by the first page ID and wherein the first logical address and the first page ID are not stored in the page identified by the first page ID;
receiving a request to write a second datum to the persistent storage, wherein the second datum is defined using a second logical address;
determining a second physical address in the persistent storage, wherein the second physical address comprises the first block ID and a second page ID;
writing a second frag comprising a copy of the second datum to a second location in the persistent storage by identified by the second physical address;
generating a second TE comprising the second logical address and the second page ID, wherein the second TE is not stored in a page identified by the second page ID and wherein the second logical address and the second page ID are not stored in the page identified by the second page ID;
generating a table of contents (TOC) page, wherein the TOC page comprises the first TE and the second TE, and wherein the TOC page does not include the first datum and the second datum; and
writing the TOC page to a third physical address in the persistent storage, wherein the third physical address comprises the first block ID and a third page ID.

6. The method of claim 5, further comprising:
receiving a request to write a third datum to the persistent storage, wherein the third datum is defined using a third logical address;
determining a fourth physical address in the persistent storage, wherein the fourth physical address comprises the first block ID and a fourth page ID;
writing a third frag comprising a copy of the third datum to the fourth physical address;
generating a third TE comprising the third logical address, and the fourth page ID, wherein the third TE is not stored in a page identified by the fourth page ID;
generating a second TOC page comprising the third TE;
writing the second TOC page to a fifth physical address in the persistent storage, wherein the fifth physical address comprises the first block ID and a fifth page ID and, wherein the second TOC page does not include the third datum.

7. The method of claim 6, wherein a fifth page corresponding to the fifth page ID is the last page in the first block.

8. The method of claim 7, wherein the second TOC page comprises a reference to the first TOC page.

9. The method of claim 8, wherein the reference is located at the end of the second TOC page.

10. The method of claim 5, wherein prior to writing the first frag to the first physical address in the persistent storage, a first copy of the first frag is stored in a first memory and a second copy of the first frag is stored in a second memory, wherein a third TE is generated for the second copy of the first frag, wherein the third TE is erased once the TOC page is written to the third physical memory address.

11. The method of claim 10, wherein the first memory is located in a first storage module and the second memory is located in a second storage module, and wherein the persistent storage is located in the first memory module.

12. The method of claim 5, wherein the first TE further comprises at least one selected from a group consisting of a birth time field, a type field, a logical length field, and a kind field.

13. The method of claim 5, wherein the first logical address comprises an object ID and an offset ID.

14. A method for populating an in-memory datum structure, comprising:

(a) selecting a first block in a persistent storage;
(b) extracting a last page in the first block, wherein the first block is associated with a first block ID;
(c) extracting a first table of contents entry (TE) from the last page in the first block, wherein the first TE comprises a first logical address for a first datum, and a first page ID identifying a page in the first block in which the first datum is located, wherein the page is not the last page and wherein the first logical address does not include the page ID and wherein the first logical address and the first page ID are not stored in the page;
(d) generating a first physical address for the first datum using the first block ID and the first page ID extracted from the first TE, wherein the first physical address comprises the first page ID;
(e) hashing the first logical address to obtain a first hash value; and
(f) populating the in-memory data structure with a first mapping between the first hash value and the first physical address.

15. The method of claim 14, further comprising:
(g) selecting a second block in the persistent storage;
(h) extracting a last page in the second block, wherein the second block is associated with a second block ID;
(i) extracting second TE from the last page in the second block, wherein the second TE comprises a second logical address for a second datum, and a second page ID corresponding to a page in the second block in which the second datum is located;
(j) generating a second physical address for the second datum using the second block ID and the second page ID extracted from the second TE;
(k) hashing the second logical address to obtain a second hash value; and
(l) populating the in-memory data structure with a second mapping between the second hash value and the second physical address.

16. The method of claim 15, wherein (a)-(c) and (g)-(i) occur in parallel.

17. The method of claim 15, wherein the first block is located in a first storage module, the second block is located in the second storage module, and wherein the in-memory data structure is located in memory external to the first storage module and the second storage module.

18. The method of claim 14, further comprising:
making a determination that the last page in the first block comprises a reference to the second page in the first block, wherein the second page comprises a second TE, wherein the second TE comprises a second logical address for a second datum, and a second page ID corresponding to a page in the first block in which the second datum is located;
generating a second physical address for the second datum using the first block ID, and the second page ID;
hashing the second logical address to obtain a second hash value; and
populating the in-memory data structure with a second mapping between the second hash value and the second physical address.

19. The method of claim 14, wherein the persistent storage is solid state memory.

20. The method of claim 14, wherein the in-memory data structure is populated with all TEs in the persistent storage prior to any operations in a group consisting of a read operation, a write operation, and an erase operation being performed on any datum stored in the persistent storage.

21. The method of claim 14, wherein the first logical address comprises an object ID and an offset ID.

22. A method for storing data, comprising:
receiving a request to write a first datum to persistent storage, wherein the first datum is defined using a first logical address;
determining a first physical address in persistent storage, wherein the first physical address comprises a first block ID and a first page ID;
prior to writing a first frag to a first physical address in the persistent storage:
storing a first copy of the first frag is in a first memory and a second copy of the first frag in a second memory;
writing the first frag comprising a copy of the first datum to the first physical address;
generating a first table of contents entry (TE) comprising the first logical address and the first page ID;
receiving a request to write a second datum to the persistent storage, wherein the second datum is defined using a second logical address;
determining a second physical address in the persistent storage, wherein the second physical address comprises the first block ID and a second page ID;
writing a second frag comprising a copy of the second datum to the second physical address;
generating a second TE comprising the second logical address and the second page ID;
generating a table of contents (TOC) page, wherein the TOC page comprises the first TE and the second TE; and
writing the TOC page to a third physical address in the persistent storage, wherein the third physical address comprises the first block ID and a third page ID, wherein a third TE is generated for the second copy of the first frag, wherein the third TE is erased once the TOC page is written to the third physical memory address.

* * * * *